United States Patent
Suzuki et al.

(10) Patent No.: US 10,174,699 B2
(45) Date of Patent: Jan. 8, 2019

(54) EXHAUST GAS PURIFICATION SYSTEM FOR AN INTERNAL COMBUSTION ENGINE

(71) Applicant: Toyota Jidosha Kabushiki Kaisha, Toyota-shi, Aichi-ken (JP)

(72) Inventors: Kazuya Suzuki, Susono (JP); Koichi Hoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 101 days.

(21) Appl. No.: 15/496,335

(22) Filed: Apr. 25, 2017

(65) Prior Publication Data

US 2017/0314489 A1    Nov. 2, 2017

(30) Foreign Application Priority Data

Apr. 28, 2016  (JP) .................. 2016-091180

(51) Int. Cl.

| | |
|---|---|
| *F01N 3/00* | (2006.01) |
| *F02D 41/14* | (2006.01) |
| *F01N 3/10* | (2006.01) |
| *F02D 41/02* | (2006.01) |
| *F02D 41/00* | (2006.01) |

(52) U.S. Cl.
CPC ......... *F02D 41/1408* (2013.01); *F01N 3/101* (2013.01); *F02D 41/008* (2013.01); *F02D 41/025* (2013.01); *F02D 41/0295* (2013.01); *Y02A 50/2324* (2018.01); *Y02T 10/22* (2013.01)

(58) Field of Classification Search
CPC .. F01N 11/007; F01N 13/008; F01N 2430/06; F01N 2560/025; F01N 3/101; F01N 9/00; F02D 41/008; F02D 41/0295; F02D 41/1439; F02D 41/1454; F02D 41/1473; F02D 41/263

See application file for complete search history.

(56) References Cited

U.S. PATENT DOCUMENTS

| | | | | |
|---|---|---|---|---|
| 6,311,482 B1 * | 11/2001 | Yamashita | ............. | B60K 6/485 60/284 |
| 6,769,422 B2 * | 8/2004 | Ohkuma | ............... | F02D 41/148 123/696 |
| 2004/0250534 A1 | 12/2004 | Tanaka et al. | | |

(Continued)

FOREIGN PATENT DOCUMENTS

| | | |
|---|---|---|
| JP | 2001-050082 A | 2/2001 |
| JP | 2004-353552 A | 12/2004 |

*Primary Examiner* — Audrey K Bradley
*Assistant Examiner* — Anthony Ayala Delgado
(74) *Attorney, Agent, or Firm* — Dinsmore & Shohl LLP

(57) ABSTRACT

When the air fuel ratio dither control is carried out, an air fuel ratio of a mixture in each of one or more lean cylinders and one or more rich cylinders is controlled so that an average value of an air fuel ratio of exhaust gas flowing into the three-way catalyst becomes a predetermined target exhaust gas air fuel ratio. At this time, the air fuel ratio dither control is carried out by setting, as the one or more rich cylinders, at least a cylinder for which a degree of uniformity of the flow speed distribution of exhaust gas, which is a degree of uniformity of the flow speed distribution of exhaust gas discharged from that cylinder on a cross section of the three-way catalyst, is the lowest in the cylinder group of an internal combustion engine.

8 Claims, 10 Drawing Sheets

| ORDER OF DEGREES OF UNIFORMITY OF FLOW SPEED DISTRIBUTIONS | 1 | 2 | 3 | 4 |
|---|---|---|---|---|
| CYLINDER | #2 | #4 | #1 | #3 |

(56) References Cited

U.S. PATENT DOCUMENTS

| | | | |
|---|---|---|---|
| 2012/0323466 A1* | 12/2012 | Iwazaki | F02D 41/0085 |
| | | | 701/104 |
| 2013/0138329 A1* | 5/2013 | Aoki | F02D 41/0085 |
| | | | 701/104 |
| 2013/0179051 A1* | 7/2013 | Tomimatsu | F02D 17/02 |
| | | | 701/104 |
| 2017/0314496 A1* | 11/2017 | Suzuki | F02D 41/008 |

* cited by examiner

[Fig. 1]
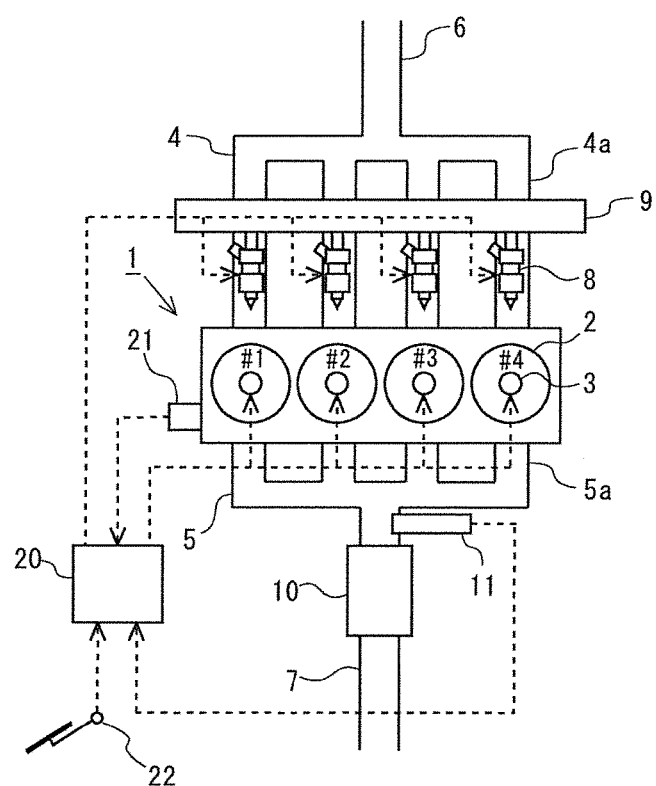

[Fig. 2]
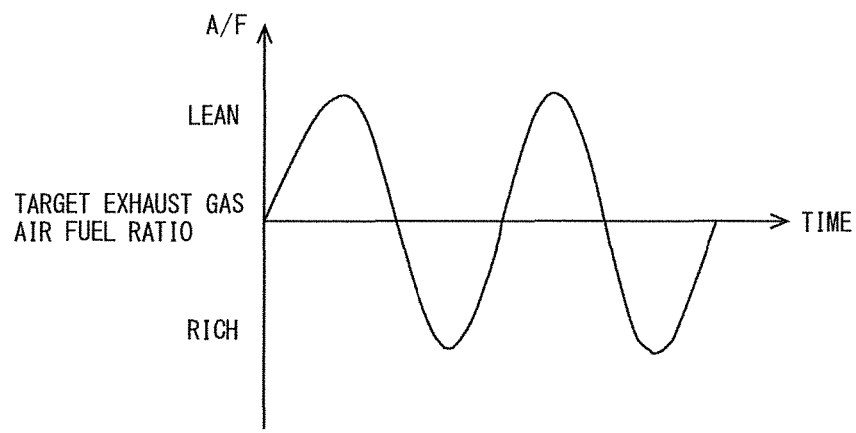
[Fig. 3]
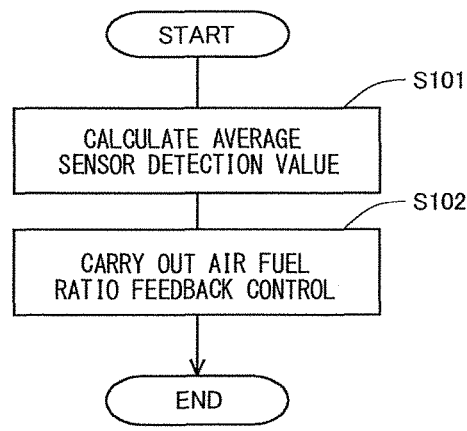

[Fig. 4]
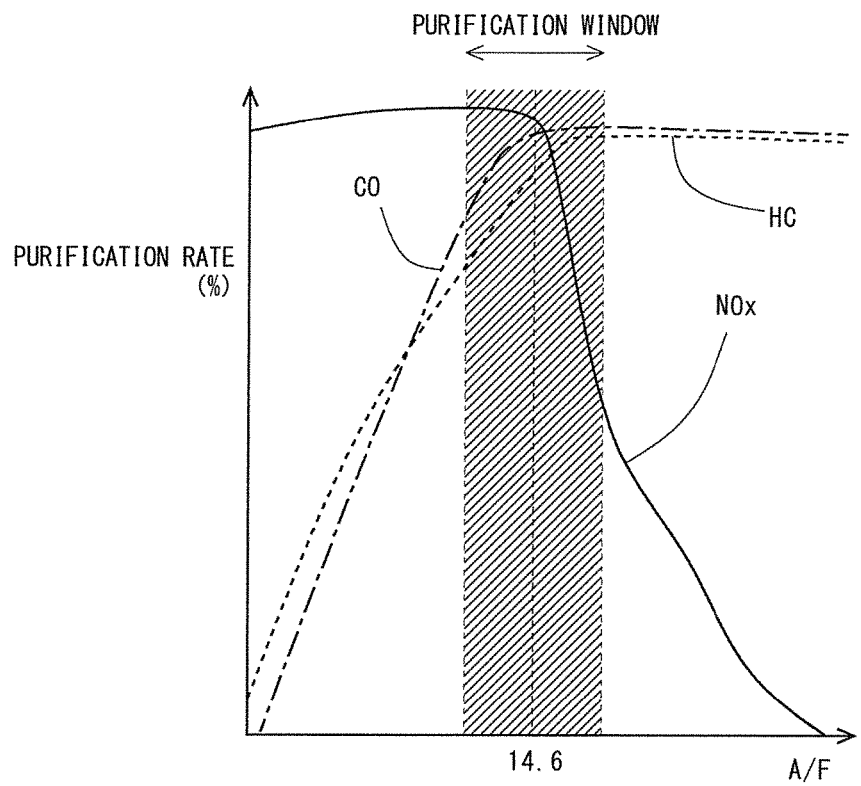
[Fig. 5]
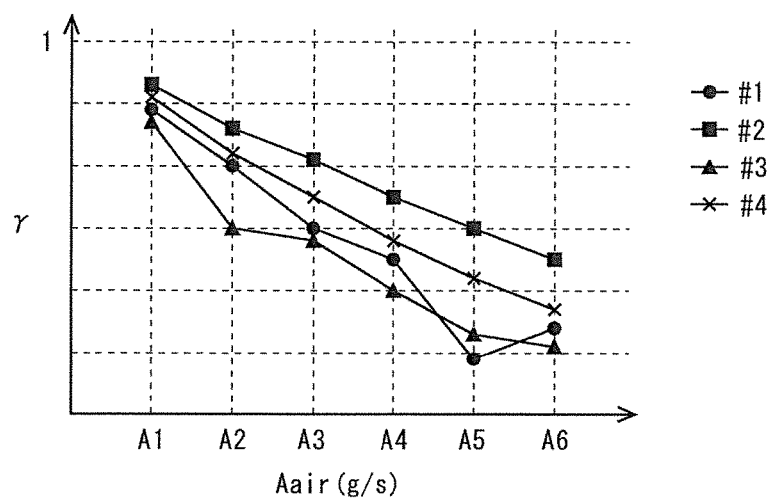

[Fig. 6]
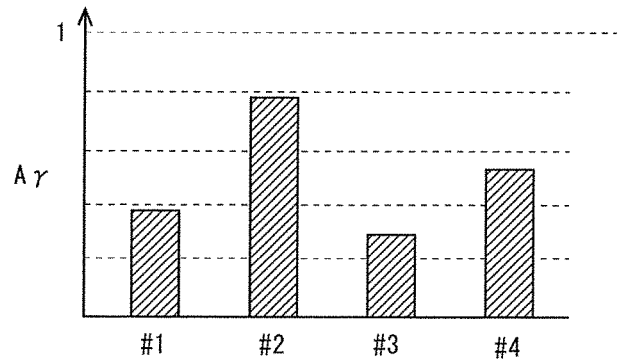
[Fig. 7]
| ORDER OF DEGREES OF UNIFORMITY OF FLOW SPEED DISTRIBUTIONS | 1 | 2 | 3 | 4 |
|---|---|---|---|---|
| CYLINDER | #2 | #4 | #1 | #3 |
[Fig. 8]
ORDER OF COMBUSTION →
| CYLINDER | #1 | #3 | #4 | #2 |
|---|---|---|---|---|
| ASSIGNMENT OF LEAN CYLINDERS AND RICH CYLINDERS | L | R | L | R |
R: RICH CYLINDER
L: LEAN CYLINDER

[Fig. 9]

ORDER OF COMBUSTION →

| CYLINDER | #1 | #3 | #4 | #2 |
|---|---|---|---|---|
| ASSIGNMENT OF LEAN CYLINDERS AND RICH CYLINDERS | L | R | L | L |

R:RICH CYLINDER
L:LEAN CYLINDER

[Fig. 10]

ORDER OF COMBUSTION →

| CYLINDER | #1 | #3 | #4 | #2 |
|---|---|---|---|---|
| ASSIGNMENT OF LEAN CYLINDERS AND RICH CYLINDERS | R | R | L | L |

R:RICH CYLINDER
L:LEAN CYLINDER

[Fig. 11]

ORDER OF COMBUSTION →

| CYLINDER | #1 | #3 | #4 | #2 |
|---|---|---|---|---|
| ASSIGNMENT OF LEAN CYLINDERS AND RICH CYLINDERS | R | R | R | L |

R:RICH CYLINDER
L:LEAN CYLINDER

[Fig. 12]
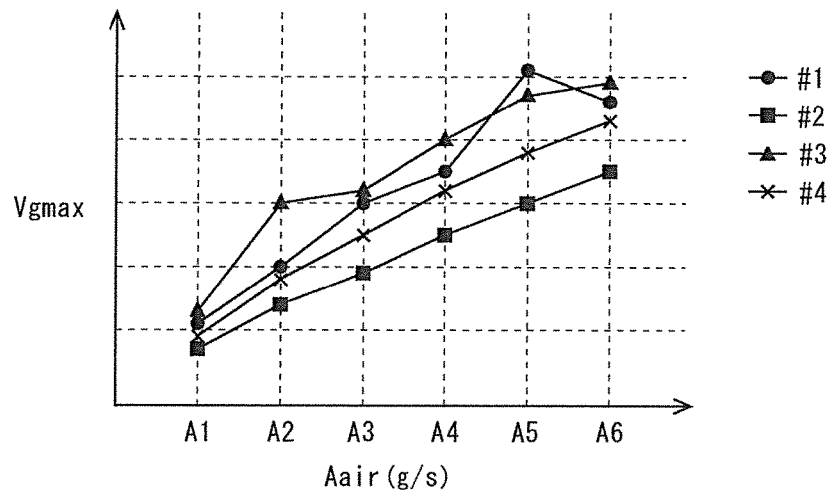
[Fig. 13]
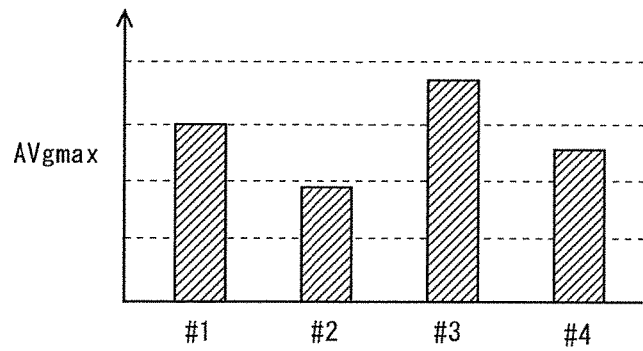
[Fig. 14]
| ORDER OF MAXIMUM FLOW SPEEDS | 1 | 2 | 3 | 4 |
|---|---|---|---|---|
| CYLINDER | #3 | #1 | #4 | #2 |

[Fig. 15]
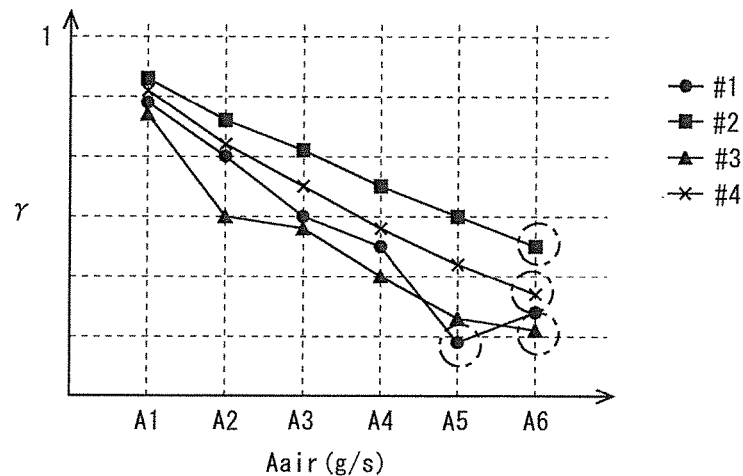
[Fig. 16]
| ORDER OF DEGREES OF UNIFORMITY OF FLOW SPEED DISTRIBUTIONS | 1 | 2 | 3 | 4 |
|---|---|---|---|---|
| CYLINDER | #2 | #4 | #3 | #1 |
[Fig. 17]
ORDER OF COMBUSTION →
| CYLINDER | #1 | #3 | #4 | #2 |
|---|---|---|---|---|
| ASSIGNMENT OF LEAN CYLINDERS AND RICH CYLINDERS | R | L | R | L |
R: RICH CYLINDER
L: LEAN CYLINDER

[Fig. 18]
ORDER OF COMBUSTION →
| CYLINDER | #1 | #3 | #4 | #2 |
|---|---|---|---|---|
| ASSIGNMENT OF LEAN CYLINDERS AND RICH CYLINDERS | R | L | L | L |
R:RICH CYLINDER
L:LEAN CYLINDER
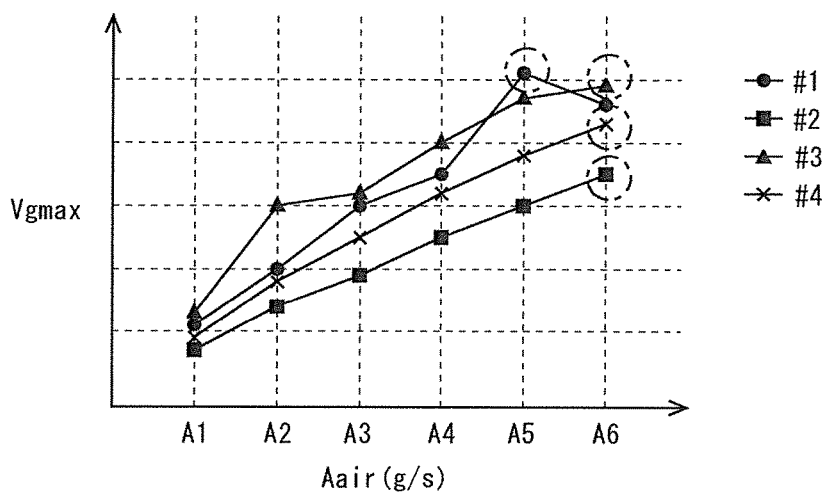
[Fig. 19]
[Fig. 20]
| ORDER OF MAXIMUM FLOW SPEEDS | 1 | 2 | 3 | 4 |
|---|---|---|---|---|
| CYLINDER | #1 | #3 | #4 | #2 |

[Fig. 21]
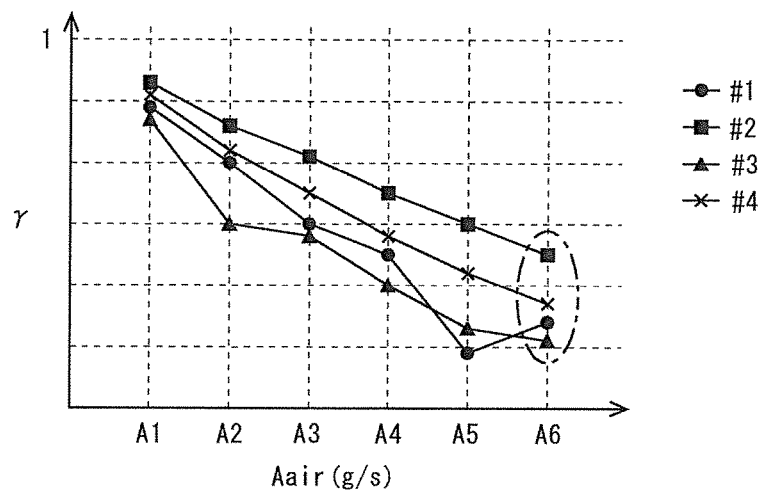
[Fig. 22]
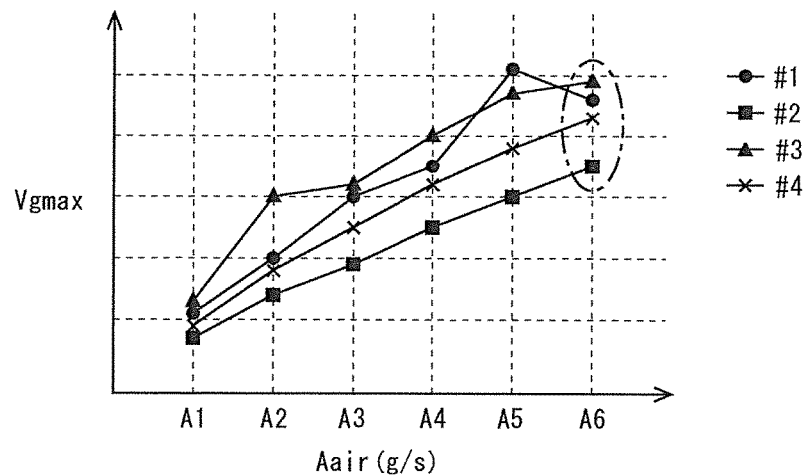

[Fig. 23]
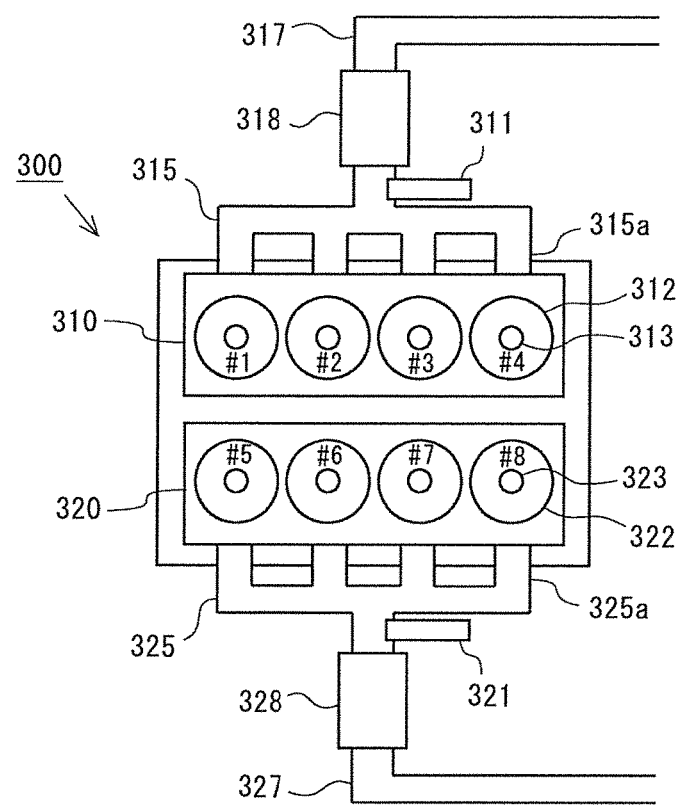

EXHAUST GAS PURIFICATION SYSTEM FOR AN INTERNAL COMBUSTION ENGINE

CROSS-REFERENCE TO RELATED APPLICATIONS

This application claims the benefit of Japanese Patent Application No. 2016-091180, filed Apr. 28, 2016, which is incorporated by reference herein in its entirety.

BACKGROUND

Technical Field

The present disclosure relates to an exhaust gas purification system for an internal combustion engine.

Description of the Related Art

In the past, there has been known a technology in which in an exhaust gas purification system for an internal combustion engine comprising a three-way catalyst arranged in an exhaust passage, air fuel ratio dither control is carried out in order to raise the temperature of the three-way catalyst. In the air fuel ratio dither control, the air fuel ratio of a mixture in a part of cylinders may be controlled to a lean air fuel ratio which is leaner than a stoichiometric air fuel ratio, and the air fuel ratio of a mixture in a part of the remaining cylinders may be controlled to a rich air fuel ratio which is richer than the stoichiometric air fuel ratio. Hereinafter, in such air fuel ratio dither control, that cylinder in which the air fuel ratio of a mixture is controlled to a lean air fuel ratio is referred to as "lean cylinder". In addition, in such air fuel ratio dither control, that cylinder in which the air fuel ratio of a mixture is controlled to a rich air fuel ratio is referred to as "rich cylinder". Moreover, in the air fuel ratio dither control, the air fuel ratio of a mixture in each of the lean cylinder(s) and the rich cylinder(s) is controlled in such a manner that an average value of the air fuel ratio (hereinafter, this may be referred to as an "average exhaust gas air fuel ratio".) of the exhaust gas flowing into the three-way catalyst (hereinafter, this may be referred to as an "incoming exhaust gas".) becomes a predetermined target exhaust gas air fuel ratio.

When the air fuel ratio dither control is carried out, a period of time in which the exhaust gas discharged from each of the lean cylinder mainly flows into the three-way catalyst, and a period of time in which the exhaust gas discharged from each of the rich cylinder mainly flows into the three-way catalyst, will be repeated in an alternate manner. In other words, the exhaust gas of the lean air fuel ratio and the exhaust gas of the rich air fuel ratio will be supplied to the three-way catalyst in an alternate manner. At this time, when the exhaust gas of the lean air fuel ratio is supplied to the three-way catalyst, oxygen in the exhaust gas is held or stored in the three-way catalyst. Then, when the exhaust gas of the rich air fuel ratio is supplied to the three-way catalyst, HC and CO in the exhaust gas are oxidized by the oxygen held in the three-way catalyst. The temperature rise of the three-way catalyst will be promoted by the heat of oxidation of HC and CO at this time. In addition, during the execution of the air fuel ratio dither control, too, not only the HC and CO are oxidized, but also the NOx in the exhaust gas is reduced, in the three-way catalyst. In other words, according to the air fuel ratio dither control, the temperature rise of the three-way catalyst can be promoted, while exhibiting HC and CO oxidation functions and an NOx reduction function in the three-way catalyst.

Here, in patent literature 1, there is disclosed a technology in which in air fuel ratio dither control, the air fuel ratio of a mixture in the lean cylinder(s) and the air fuel ratio of a mixture in the rich cylinder(s) are controlled in a feedback manner based on a detected value of an air fuel ratio sensor which is arranged in an exhaust passage at the upstream side of a three-way catalyst.

In addition, in patent literature 2, there is disclosed a technology in which in the course of the execution of the air fuel ratio dither control, the lean cylinder(s) and the rich cylinder(s) are switched over in such a pattern that the same cylinder does not continuously become the lean cylinder or the rich cylinder.

CITATION LIST

Patent Literature

Patent Literature 1: Japanese patent laid-open publication No. 2001-050082
Patent Literature 2: Japanese patent laid-open publication No. 2004-353552

SUMMARY

Technical Problem

The exhaust gas discharged from each cylinder in a cylinder group of the internal combustion engine flows into a common exhaust passage, while passing through an exhaust branch pipe connected to that cylinder, and also flows into a three-way catalyst arranged in the common exhaust passage. At this time, the exhaust gas discharged from each cylinder does not necessarily flow into the three-way catalyst in a state of uniformly spreading over on a cross section of the three-way catalyst (i.e., a cross section which crosses at right angles to an axial direction of the exhaust passage).

In other words, due to the shapes of the individual exhaust branch pipes, the connection positions of the individual exhaust branch pipes to their merge portion, the shape of a portion of the exhaust passage at the upstream side of the three-way catalyst, and so on, there occurs such a phenomenon that the flow rate of the exhaust gas flowing into the three-way catalyst becomes relatively large in some portions of the cross section of the three-way catalyst (i.e., the flow speed of incoming exhaust gas is relatively large), and relatively small in the other portions thereof (i.e., the flow speed of the incoming exhaust gas is relatively small). Accordingly, in the three-way catalyst, a deviation or shift will occur on a cross section thereof in the distribution of the flow speed (or the distribution of the flow rate) of the exhaust gas discharged from each cylinder.

Hereinafter, the deviation or shift of the distribution of the flow speed of the exhaust gas on the cross section of the three-way catalyst as mentioned above will be explained by using, as an index, the "degree of uniformity of the distribution of the flow speed of the exhaust gas", which is the degree of uniformity (or homogeneity) of the distribution of the flow speed of the exhaust gas discharged from each cylinder on the cross section of the three-way catalyst. Here, the degree of uniformity of the distribution of the flow speed of the exhaust gas being high represents that the extent (degree) of deviation or shift of the distribution of the flow speed of the exhaust gas on the cross section of the three-way catalyst is small, whereas the degree of uniformity of the distribution of the flow speed of the exhaust gas being low represents that the extent (degree) of deviation or shift of the distribution of the flow speed of the exhaust gas on the cross section of the three-way catalyst is large.

As described above, the deviation or shift of the distribution of the flow speed on the cross section of the three-way catalyst occurs resulting from the shapes of the individual exhaust branch pipes, the connection positions of the individual exhaust branch pipes to their merge portion, the shape of the portion of the exhaust passage at the upstream side of the three-way catalyst, and so on. Accordingly, even in the case of the same cylinder group, the degree of uniformity of the distribution of the flow speed of exhaust gas (hereinafter, also referred to as the degree of uniformity of the flow speed distribution of exhaust gas) may be different from cylinder to cylinder. In other words, even in the same cylinder group, there may be a case where the degree of uniformity of the flow speed distribution of exhaust gas is relatively high for some cylinders, and the degree of uniformity of the flow speed distribution of exhaust gas may be relatively low for other cylinders.

Here, as mentioned above, in the air fuel ratio dither control, the air fuel ratio of the mixture in each of the lean cylinder(s) and the rich cylinder(s) is controlled so that the average exhaust gas air fuel ratio of the incoming exhaust gas becomes the predetermined target exhaust gas air fuel ratio. However, in the course of the execution of the air fuel ratio dither control, even if the average exhaust gas air fuel ratio as a whole of the incoming exhaust gas is controlled to the target exhaust gas air fuel ratio, in the three-way catalyst, there may partially occur a location in which the average exhaust gas air fuel ratio of the exhaust gas flowing through a portion of the three-way catalyst is in a state shifted from the target exhaust gas air fuel ratio, resulting from the difference in the degree of uniformity of the flow speed distribution of the exhaust gas for each cylinder, as mentioned above. Then, when there occurs a portion of the three-way catalyst in which the average exhaust gas air fuel ratio shifted to the lean side with respect to the target exhaust gas air fuel ratio, it may become difficult to reduce NOx sufficiently in that portion. As a result, there is a fear that the NOx purification (reduction) rate in the three-way catalyst as a whole may decrease below an allowable range.

The present disclosure has been made in view of the above-mentioned problems, and has for its object to suppress a decrease in an NOx reduction rate in a the three-way catalyst in the course of the execution of air fuel ratio dither control.

Solution to Problem

In a first aspect of the present disclosure, at the time of performing air fuel ratio dither control, it may be carried out by setting at least a cylinder with the lowest degree of uniformity of flow speed distribution in a cylinder group of an internal combustion engine as the rich cylinder.

More specifically, an exhaust gas purification system for an internal combustion engine according to the first aspect of the present disclosure resides in an exhaust gas purification system for an internal combustion engine comprising a cylinder group including a plurality of cylinders, the system comprising: a three-way catalyst that is arranged in an exhaust passage at the downstream side of a merge portion of exhaust branch pipes which are connected to individual cylinders of the cylinder group; and a controller comprising at least one processor configured to control an air fuel ratio of a mixture in a part of the cylinders of the cylinder group to a lean air fuel ratio leaner than a stoichiometric air fuel ratio, and controls an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in such a manner that an average value of an air fuel ratio of exhaust gas flowing into the three-way catalyst becomes a predetermined target exhaust gas air fuel ratio; wherein the controller carries out the air fuel ratio dither control, by always setting same one or more cylinders in the cylinder group as the one or more lean cylinders, and by always setting other same one or more cylinders in the cylinder group as the one or more rich cylinders, and the controller further may carry out the air fuel ratio dither control by setting, as the one or more rich cylinders, at least a cylinder for which a degree of uniformity of the flow speed distribution of exhaust gas, which is a degree of uniformity of the flow speed distribution of exhaust gas discharged from the cylinder on a cross section of the three-way catalyst, is the lowest in the cylinder group.

The internal combustion engine according to the present disclosure has the cylinder group including the plurality of cylinders. The number of the cylinder groups which the internal combustion engine has may be one or may be plural. In addition, in the arrangement according to the present disclosure, in cases where the internal combustion engine has a plurality of cylinder groups, a three-way catalyst is arranged in each of exhaust passages corresponding to the individual cylinder groups, respectively. Moreover, according to the present disclosure, in the cylinder groups, one or more cylinders set as the one or more lean cylinders at the time when the air fuel ratio dither control is carried out, and one or more cylinders set as the one or more rich cylinders at the time when the air fuel ratio dither control is carried out have been determined in advance. Then, the controller carries out the air fuel ratio dither control, by always setting same one or more cylinders in the cylinder groups as the one or more lean cylinders, and by always setting other same one or more cylinders in the cylinder groups as the one or more rich cylinders.

As mentioned above, even in the case of the same cylinder group, the degree of uniformity of the flow speed distribution of exhaust gas may be different from cylinder to cylinder. In other words, there may be a case where even in the same cylinder group, the degree of uniformity of the flow speed distribution of exhaust gas is relatively high for some cylinders, and the degree of uniformity of the flow speed distribution of exhaust gas may be relatively low for other cylinders. In such a case, when the air fuel ratio dither control is carried out by setting, as the one or more lean cylinders, a cylinder with a relatively low degree of uniformity of the flow speed distribution of exhaust gas, a portion in the three-way catalyst becomes easy to occur through which the exhaust gas discharged from the lean cylinder, i.e., the exhaust gas of a lean air fuel ratio, flows relatively intensively during the execution of the air fuel ratio dither control. In other words, the exhaust gas of the lean air fuel ratio becomes easy to flow through a specific portion on the cross section of the three-way catalyst. Then, even if an average exhaust gas air fuel ratio is controlled to a target exhaust gas air fuel ratio as a whole of the incoming exhaust gas, the average exhaust gas air fuel ratio during the execution of the air fuel ratio dither control becomes easy to shift to a lean side with respect to the target exhaust gas air fuel ratio, in the portion in the three-way catalyst in which the exhaust gas of the lean air fuel ratio flows relatively intensively. In that case, in that portion in the three-way catalyst, it may become difficult to reduce the NOx in the exhaust gas to a sufficient extent. As a result, there is a fear of causing a decrease in the NOx removal or reduction rate in the three-way catalyst as a whole in the course of the execution of the air fuel ratio dither control.

Accordingly, in the first aspect of the present disclosure, the controller may carry out the air fuel ratio dither control, by setting, as the one or more rich cylinders, at least a cylinder with the lowest degree of uniformity of the flow speed distribution of exhaust gas in each cylinder group. With this, in the three-way catalyst, a portion becomes hard to occur in which the exhaust gas of a lean air fuel ratio flows relatively intensively, during the execution of the air fuel ratio dither control. In that case, during the execution of the air fuel ratio dither control, a portion in the three-way catalyst becomes hard to occur in which the average exhaust gas air fuel ratio of the incoming exhaust gas shifts to the lean side with respect to the target exhaust gas air fuel ratio on a cross section of the three-way catalyst. Or, even if there occurs a portion of the three-way catalyst in which the average exhaust gas air fuel ratio of the incoming exhaust gas on a cross section of the three-way catalyst shifts to the lean side with respect to the target exhaust gas air fuel ratio, during the execution of the air fuel ratio dither control, the amount of such a shift will be decreased. Accordingly, according to the present disclosure, it is possible to suppress the decrease of the NOx removal or reduction rate in the three-way catalyst in the course of the execution of the air fuel ratio dither control.

Here, note that when the air fuel ratio dither control is carried out by setting, as the one or more rich cylinders, a cylinder with a relatively low degree of uniformity of the flow speed distribution of exhaust gas, a portion in the three-way catalyst becomes easy to occur through which the exhaust gas discharged from the rich cylinder, i.e., the exhaust gas of a rich air fuel ratio, flows relatively intensively during the execution of the air fuel ratio dither control, contrary to the case where the air fuel ratio dither control is carried out by setting, as the one or more lean cylinders, a cylinder with a relatively low degree of uniformity of the flow speed distribution of exhaust gas. In other words, the exhaust gas of the rich air fuel ratio becomes easy to flow through a specific portion on the cross section of the three-way catalyst. In that case, even if an average exhaust gas air fuel ratio is controlled to a target exhaust gas air fuel ratio as a whole of the incoming exhaust gas, in that portion in the three-way catalyst in which the exhaust gas of the rich air fuel ratio flows relatively intensively, the average exhaust gas air fuel ratio during the execution of the air fuel ratio dither control becomes easy to shift to a rich side with respect to the target exhaust gas air fuel ratio. However, the degree of decrease in each of the HC and CO purification (removal or oxidation) rates in the three-way catalyst in the case where the air fuel ratio of the incoming exhaust gas has shifted to the rich side with respect to the stoichiometric air fuel ratio is smaller than the degree of decrease in the NOx purification (removal or reduction) rate in the three-way catalyst in the case where the air fuel ratio of the incoming exhaust gas has shifted to the lean side with respect to the stoichiometric air fuel ratio. Accordingly, in the present disclosure, priority may be given to suppressing the occurrence of the portion in which the exhaust gas of the lean air fuel ratio flows relatively intensively, rather than suppressing the occurrence of the portion in which the exhaust gas of the rich air fuel ratio flows relatively intensively, in the three-way catalyst during the execution of the air fuel ratio dither control.

In the first aspect of the present disclosure, the controller may carry out the air fuel ratio dither control, by setting, as the one or more rich cylinders, at least a cylinder with the lowest degree of uniformity of the flow speed distribution of the exhaust gas in a cylinder group, and setting, as the one or more lean cylinders, at least a cylinder with the highest degree of uniformity of the flow speed distribution of the exhaust gas in the cylinder group. With this, it becomes harder to occur a portion in the three-way catalyst in which the exhaust gas of a lean air fuel ratio flows relatively intensively during the execution of the air fuel ratio dither control. For that reason, it becomes harder to occur a portion of the three-way catalyst in which the average exhaust gas air fuel ratio of the incoming exhaust gas on a cross section of the three-way catalyst shifts to the lean side with respect to the target exhaust gas air fuel ratio, during the execution of the air fuel ratio dither control. Or, even if there occurs a portion of the three-way catalyst in which the average exhaust gas air fuel ratio of the incoming exhaust gas on a cross section of the three-way catalyst shifts to the lean side with respect to the target exhaust gas air fuel ratio, during the execution of the air fuel ratio dither control, the amount of such a shift will be further decreased.

In addition, the air fuel ratio dither control may be carried out by setting, as the one or more rich cylinders, two or more of the plurality of cylinders in a cylinder group. In the first aspect of the present disclosure, in such a case, the controller may carry out the air fuel ratio dither control, by setting, as the one or more rich cylinders, cylinders in the cylinder group in ascending order of the degrees of uniformity of the flow speed distributions of exhaust gases from the lowest degree of uniformity of the flow speed distribution of exhaust gas.

Moreover, the air fuel ratio dither control may be carried out by setting, as the one or more rich cylinders, two cylinders of which the order of combustion is continuous among the plurality of cylinders in a cylinder group. In the first aspect of the present disclosure, in such a case, the controller may carry out the air fuel ratio dither control, by setting, as the one or more rich cylinders, a cylinder with the lowest degree of uniformity of the flow speed distribution of the exhaust gas in the cylinder group and another cylinder for which the degree of uniformity of the flow speed distribution of exhaust gas is the lower of a cylinder of which the combustion order is immediately before the cylinder with the lowest degree of uniformity of the flow speed distribution of exhaust gas and a cylinder of which the combustion order is immediately after the cylinder with the lowest degree of uniformity of the flow speed distribution of exhaust gas.

According to these, when the air fuel ratio dither control is carried out by assigning or setting a plurality of cylinders as the one or more rich cylinders, it becomes harder to occur a portion in the three-way catalyst in which the exhaust gas of a lean air fuel ratio flows relatively intensively during the execution of the air fuel ratio dither control. For that reason, it is harder to occur a portion of the three-way catalyst in which the average exhaust gas air fuel ratio of the incoming exhaust gas on a cross section of the three-way catalyst shifts to the lean side with respect to the target exhaust gas air fuel ratio, during the execution of the air fuel ratio dither control. Or, even if there occurs a portion of the three-way catalyst in which the average exhaust gas air fuel ratio of the incoming exhaust gas on a cross section of the three-way catalyst shifts to the lean side with respect to the target exhaust gas air fuel ratio, during the execution of the air fuel ratio dither control, the amount of such a shift will be further decreased.

Further, the degree of uniformity of the flow speed distribution of exhaust gas has a correlation with a maximum flow speed of the exhaust gas on the cross section of the three-way catalyst (hereinafter, this may be referred to simply as a "maximum flow speed of the exhaust gas"). In other words, the lower the degree of uniformity of the flow speed distribution of the exhaust gas, the more intensively the exhaust gas flows in a specific portion on the cross section of the three-way catalyst, and so, the larger the maximum flow speed of the exhaust gas tends to become. Accordingly, in a second aspect of the present disclosure, at the time of performing air fuel ratio dither control, this air fuel ratio dither control may be carried out by setting, as one or more rich cylinders, at least a cylinder for which the maximum flow speed of the exhaust gas discharged therefrom is the largest, in a cylinder group of an internal combustion engine.

More specifically, an exhaust gas purification system for an internal combustion engine according to the second aspect of the present disclosure resides in an exhaust gas purification system for an internal combustion engine comprising a cylinder group including a plurality of cylinders, the system comprising: a three-way catalyst that is arranged in an exhaust passage at the downstream side of a merge portion of exhaust branch pipes which are connected to individual cylinders of the cylinder group; and a controller comprising at least one processor configured to control an air fuel ratio of a mixture in a part of the cylinders of the cylinder group to a lean air fuel ratio leaner than a stoichiometric air fuel ratio, and controls an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in such a manner that an average value of an air fuel ratio of exhaust gas flowing into the three-way catalyst becomes a predetermined target exhaust gas air fuel ratio; wherein the controller carries out the air fuel ratio dither control, by always setting same one or more cylinders in the cylinder group as the one or more lean cylinders, and by always setting other same one or more cylinders in the cylinder group as the one or more rich cylinders, and the controller further may carry out the air fuel ratio dither control by setting, as the one or more rich cylinders, at least a cylinder for which a maximum flow speed of exhaust gas, which is a maximum flow speed of exhaust gas discharged from the cylinder on a cross section of the three-way catalyst, is the largest in the cylinder group.

According to the second aspect of the present disclosure, similar to the first aspect of the present disclosure, a portion in the three-way catalyst becomes hard to occur in which the exhaust gas of a lean air fuel ratio flows relatively intensively during the execution of the air fuel ratio dither control. Accordingly, it is possible to suppress a decrease in the NOx removal or reduction rate in the three-way catalyst in the course of the execution of the air fuel ratio dither control.

In the second aspect of the present disclosure, the controller may carry out the air fuel ratio dither control, by setting, as the one or more rich cylinders, at least a cylinder for which the maximum flow speed of the exhaust gas is largest in the cylinder group, and setting, as the one or more lean cylinders, at least a cylinder in which the maximum flow speed of the exhaust gas in the cylinder group is the smallest. With this, it becomes harder to occur a portion in the three-way catalyst in which the exhaust gas of a lean air fuel ratio flows relatively intensively during the execution of the air fuel ratio dither control.

In addition, in the second aspect of the present disclosure, when the air fuel ratio dither control is carried out by setting, as the one or more rich cylinders, two or more of the plurality of cylinders in the cylinder group, the controller may carry out the air fuel ratio dither control, by setting, as the one or more rich cylinders, cylinders in the cylinder group in descending order of the maximum flow speeds of exhaust gases from the largest maximum flow speed of exhaust gas.

Moreover, in the second aspect of the present disclosure, when the air fuel ratio dither control is carried out by setting, as the one or more rich cylinders, two cylinders of which the order of combustion is continuous among the plurality of cylinders in the cylinder group, the controller may carry out the air fuel ratio dither control, by setting, as the one or more rich cylinders, a cylinder with the largest maximum flow speed of exhaust gas in the cylinder group, and another cylinder for which the maximum flow speed of exhaust gas is the larger of a cylinder of which the combustion order is immediately before the cylinder with the largest maximum flow speed of exhaust gas and a cylinder of which the combustion order is immediately after the cylinder with the largest maximum flow speed of exhaust gas.

According to these, when the air fuel ratio dither control is carried out by assigning or setting a plurality of cylinders as the one or more rich cylinders, it becomes harder to occur a portion in the three-way catalyst in which the exhaust gas of a lean air fuel ratio flows relatively intensively during the execution of the air fuel ratio dither control.

In the present disclosure, it is possible to suppress a decrease in the NOx removal or reduction rate in a three-way catalyst in the course of the execution of air fuel ratio dither control.

Further features of the present disclosure will become apparent from the following description of exemplary embodiments with reference to the attached drawings.

BRIEF DESCRIPTION OF DRAWINGS

FIG. 1 is a diagram showing the general configuration of an internal combustion engine and its intake and exhaust systems according to embodiments of the present disclosure.

FIG. 2 is a time chart showing the behavior of the air fuel ratio of incoming exhaust gas in the case where air fuel ratio dither control is carried out in the internal combustion engine.

FIG. 3 is a flow chart showing a flow of the air fuel ratio dither control according to the embodiments of the present disclosure.

FIG. 4 is a view showing the relation between NOx, HC and CO purification rates in the three-way catalyst and the air fuel ratio of exhaust gas.

FIG. 5 is a view showing differences, among cylinders, of the degrees of uniformity $\gamma$ of the distributions of the flow speeds of exhaust gases in the internal combustion engine illustrated in FIG. 1.

FIG. 6 is a view showing an average value $A\gamma$ of the degree of uniformity of the flow speed distribution of the exhaust gas for each cylinder, when an amount of intake air in the internal combustion engine in FIG. 5 is in the range from A1 to A6.

FIG. 7 is a view showing the relative relation among the degrees of uniformity of the distributions of the flow speeds of exhaust gases in the first through fourth cylinders of the internal combustion engine shown in FIG. 1, according to a first embodiment of the present disclosure.

FIG. 8 is a view showing a first specific example of the assignment of the lean cylinder and the rich cylinder at the time of carrying out the air fuel ratio dither control in the first embodiment of the present disclosure.

FIG. 9 is a view showing a second specific example of the assignment of the lean cylinder and the rich cylinder at the time of carrying out the air fuel ratio dither control in the first embodiment of the present disclosure.

FIG. 10 is a view showing a third specific example of the assignment of the lean cylinder and the rich cylinder at the time of carrying out the air fuel ratio dither control in the first embodiment of the present disclosure.

FIG. 11 is a view showing a fourth specific example of the assignment of the lean cylinder and the rich cylinder at the time of carrying out the air fuel ratio dither control in the first embodiment of the present disclosure.

FIG. 12 is a view showing differences, among cylinders, of the maximum flow speeds Vgmax of exhaust gases in the internal combustion engine illustrated in FIG. 1.

FIG. 13 is a view showing an average value AVgmax of the maximum flow speed of exhaust gas for each cylinder, when an amount of intake air in the internal combustion engine in FIG. 12 is in the range from A1 to A6.

FIG. 14 is a view showing the relative relation among the maximum flow speeds of exhaust gases in the first through fourth cylinders of the internal combustion engine shown in FIG. 1, according to the first embodiment of the present disclosure.

FIG. 15 is a view showing differences, among cylinders, of the degrees of uniformity γ of the distributions of the flow speeds of exhaust gases in the internal combustion engine illustrated in FIG. 1.

FIG. 16 is a view showing the relative relation among the degrees of uniformity of the distributions of the flow speeds of exhaust gases in the first through fourth cylinders of the internal combustion engine shown in FIG. 1, according to a second embodiment of the present disclosure.

FIG. 17 is a view showing a first specific example of the assignment of the lean cylinder and the rich cylinder at the time of carrying out the air fuel ratio dither control in the second embodiment of the present disclosure.

FIG. 18 is a view showing a second specific example of the assignment of the lean cylinder and the rich cylinder at the time of carrying out the air fuel ratio dither control in the second embodiment of the present disclosure.

FIG. 19 is a view showing differences, among cylinders, of the maximum flow speeds Vgmax of exhaust gases in the internal combustion engine illustrated in FIG. 1.

FIG. 20 is a view showing the relative relation among the maximum flow speeds of exhaust gases in the first through fourth cylinders of the internal combustion engine shown in FIG. 1, according to the second embodiment of the present disclosure.

FIG. 21 is a view showing differences, among cylinders, of the degrees of uniformity γ of the distributions of the flow speeds of exhaust gases in the internal combustion engine illustrated in FIG. 1.

FIG. 22 is a view showing differences, among cylinders, of the maximum flow speeds Vgmax of exhaust gases in the internal combustion engine illustrated in FIG. 1.

FIG. 23 is a diagram showing the general configuration of an internal combustion engine and its intake and exhaust systems according to a modification of the embodiments of the present disclosure.

DESCRIPTION OF EMBODIMENTS

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

First Embodiment (General Configuration)

FIG. 1 is a diagram showing the general configuration of an internal combustion engine and its intake and exhaust systems according to an embodiment of the present disclosure. The internal combustion engine denoted by 1 is a gasoline engine for driving a vehicle. The internal combustion engine 1 is an in-line four-cylinder engine comprising four cylinders 2. That is, the internal combustion engine 1 has a single or one cylinder group including four cylinders 2. However, in the internal combustion engine according to the present disclosure, the number of cylinders included in one cylinder group is not limited to four. For example, the number of cylinders included in one cylinder group may also be three or six.

Each of the cylinders 2 of the internal combustion engine 1 is provided with a spark plug 3. An intake manifold 4 and an exhaust manifold 5 are connected to the internal combustion engine 1. The intake manifold 4 has intake branch pipes 4a connected to the individual cylinders 2, respectively. The intake branch pipes 4a are each provided with a fuel injection valve 8 for injecting fuel or gasoline therein. Gasoline is supplied to the individual fuel injection valves 8 from a delivery pipe 9. In addition, a merge portion of the intake branch pipes 4a is connected to an intake passage 6.

In addition, the exhaust manifold 5 has exhaust branch pipes 5a connected to the individual cylinders 2, respectively. Then, a merge portion of the exhaust branch pipes 5a is connected to an exhaust passage 7. An air fuel ratio sensor 11 is arranged on the exhaust passage 7 at its connection portion to the merge portion of the exhaust branch pipes 5a. Moreover, a three-way catalyst 10 is arranged on the exhaust passage 7 at the immediately downstream side of the air fuel ratio sensor 11. That is, the air fuel ratio of the exhaust gas flowing into the three-way catalyst 10 is detected by the air fuel ratio sensor 11.

An electronic control unit (ECU) 20 is provided in combination with the internal combustion engine 1. This ECU 20 is a unit that controls an operating state, etc., of the internal combustion engine 1. The air fuel ratio sensor 11 is electrically connected to the ECU 20. Moreover, a crank angle sensor 21 and an accelerator opening sensor 22 are electrically connected to the ECU 20. The crank angle sensor 21 detects the crank angle of the internal combustion engine 1. The accelerator opening sensor 22 detects the degree of opening of an accelerator of a vehicle carrying thereon the internal combustion engine 1. Then, output signals of these individual sensors are inputted to the ECU 20. The ECU 20 derives the engine rotational speed of the internal combustion engine 1 based on the output signal of the crank angle sensor 21. The ECU 20 derives the engine load of the internal combustion engine 1 based on the output signal of the accelerator opening sensor 22. In addition, the individual spark plugs 3 and the individual fuel injection valves 8 are electrically connected to the ECU 20. Thus, these parts are controlled by the ECU 20. Here, note that the internal combustion engine 1 is constructed such that an amount of fuel injection from each fuel injection valve 8 is able to be changed for each cylinder 2.

(Air Fuel Ratio Dither Control)

In this embodiment, when a predetermined temperature rise condition for raising the temperature of the three-way catalyst 10 is satisfied, the ECU 20 carries out air fuel ratio dither control by adjusting an amount of fuel injection (i.e., an amount of injection from each of the fuel injection valves 8) in each of the cylinders 2. In the air fuel ratio dither control according to this embodiment, by adjusting the amount of fuel injection in each of the cylinders 2, the air fuel ratio of a mixture in a part of cylinders 2 among the four cylinders 2 is controlled to a lean air fuel ratio which is leaner than a stoichiometric air fuel ratio, and the air fuel ratio of a mixture in a part of the remaining cylinders 2 among the four cylinders 2 is controlled to a rich air fuel ratio which is richer than the stoichiometric air fuel ratio. Here, that cylinder in which the air fuel ratio of a mixture is controlled to a lean air fuel ratio is referred to as "lean cylinder", and that cylinder in which the air fuel ratio of a mixture is controlled to a rich air fuel ratio is referred to as "rich cylinder". Moreover, in the air fuel ratio dither control, the air fuel ratio of a mixture in each of the lean cylinder(s) and the rich cylinder(s) is controlled in a feedback manner based on an average value of a detected value of the air fuel ratio sensor 11 (hereinafter, this may be referred to as an "average sensor detection value"), so that an average value of the air fuel ratio (i.e., an average exhaust gas air fuel ratio) of an exhaust gas flowing into the three-way catalyst 10 (an incoming exhaust gas) becomes a predetermined target exhaust gas air fuel ratio which is set to a value in the vicinity of the stoichiometric air fuel ratio. Specifically, the amount of fuel injection from each of the fuel injection valves 8 in each of the lean cylinder(s) and the rich cylinder(s) is adjusted based on the average sensor detection value. In addition, in the air fuel ratio dither control according to this embodiment, the target exhaust gas air fuel ratio is set to an air fuel ratio in the vicinity of the stoichiometric air fuel ratio. However, the target exhaust gas air fuel ratio in the air fuel ratio dither control according to the present disclosure is not limited to an air fuel ratio in the vicinity of the stoichiometric air fuel ratio. For example, the air fuel ratio dither control may be carried out, while switching the target exhaust gas air fuel ratio between a predetermined lean air fuel ratio and a predetermined rich air fuel ratio in an alternate manner. Here, note that in such a case, the average value of the air fuel ratio of the incoming exhaust gas in the course of the execution of the air fuel ratio dither control becomes in the vicinity of the stoichiometric air fuel ratio, whereby HC and CO oxidation functions and an NOx reduction function in the three-way catalyst are exhibited, in the course of the execution of the air fuel ratio dither control, too.

FIG. 2 is a time chart which shows the behavior of the air fuel ratio of the incoming exhaust gas in the case where the air fuel ratio dither control in which combustion in the lean cylinder and combustion in the rich cylinder are repeated in an alternate manner for each cylinder is carried out in the internal combustion engine. As shown in FIG. 2, when the air fuel ratio dither control is carried out, an exhaust gas of a lean air fuel ratio and an exhaust gas of a rich air fuel ratio will be supplied to the three-way catalyst in an alternate manner. Then, an average value of the air fuel ratios of the exhaust gas of a lean air fuel ratio and the exhaust gas of a rich air fuel ratio will be controlled to the target exhaust gas air fuel ratio. Here, note that in the air fuel ratio dither control, combustion in the lean cylinder and combustion in the rich cylinder need not necessarily be repeated in an alternate manner for each cylinder. In other words, apart of the cylinders in the cylinder group need only become lean cylinder(s), and a part of the other cylinders need only become rich cylinder(s).

In this embodiment, it has been decided in advance that, when the air fuel ratio dither control is carried out, which cylinder in the first cylinder through the fourth cylinder in the internal combustion engine 1 becomes the lean cylinder, and which cylinder in the first cylinder through the fourth cylinder in the internal combustion engine 1 becomes the rich cylinder. Then, the air fuel ratio dither control is carried out by always setting the same cylinder(s) among the first to fourth cylinders as the lean cylinder(s), and by always setting the other same cylinder(s) among the first to fourth cylinders as the rich cylinder(s). Here, a flow shown in FIG. 3 is carried out by the ECU 20 in a repeated manner during the execution of the air fuel ratio dither control according to this embodiment. FIG. 3 is a flow chart showing the flow of the air fuel ratio dither control according to this embodiment. Here, note that in this embodiment, a controller according to the present disclosure is achieved by the ECU 20 carrying out this flow.

In this flow, in step S101, an average sensor detection value is calculated which is an average value of the detected value of the air fuel ratio sensor 11 in a predetermined period of time (e.g., a period of time corresponding to one combustion cycle of the internal combustion engine 1) during the execution of the air fuel ratio dither control. Subsequently, in step S102, the air fuel ratio of a mixture in each of the lean cylinder(s) and the rich cylinder(s) is controlled in a feedback manner, based on the average sensor detection value calculated in step S101. Specifically, when the average sensor detection value calculated in step S101 is higher than the target exhaust gas air fuel ratio, the amount of fuel injection in each cylinder is increased so that the air fuel ratio of the mixture in each of the lean cylinder(s) and the rich cylinder(s) goes down. On the other hand, when the average sensor detection value calculated in step S101 is lower than the target exhaust gas air fuel ratio, the amount of fuel injection in each cylinder is decreased so that the air fuel ratio of the mixture in each of the lean cylinder(s) and the rich cylinder(s) goes up. Thus, the air fuel ratio of the mixture in each of the lean cylinder(s) and the rich cylinder(s) is controlled in this manner, whereby the average exhaust gas air fuel ratio of the incoming exhaust gas will be controlled to the target exhaust gas air fuel ratio.

However, even if the average air fuel ratio is controlled to the target exhaust gas air fuel ratio as a whole of the incoming exhaust gas by means of the feedback control of the air fuel ratio as mentioned above being carried out at the time of the execution of the air fuel ratio dither control, there may occur a location in the three-way catalyst 10 in which the average exhaust gas air fuel ratio of exhaust gas flowing there partially shifts to the lean side with respect to the target exhaust gas air fuel ratio (hereinafter, such a state may be referred to as a "partial lean shift of the air fuel ratio of exhaust gas"). Hereinafter, there will be explained a factor in which the partial lean shift of the air fuel ratio of exhaust gas occurs when the air fuel ratio dither control is carried out.

The exhaust gas discharged from each cylinder 2 in a cylinder group of the internal combustion engine 1 flows into the common exhaust passage 7, while passing through an exhaust branch pipe 5a connected to that cylinder 2, and also flows into the three-way catalyst 10 arranged in the common exhaust passage 7. At this time, due to the shapes of the individual exhaust branch pipes 5a, the connection positions of the individual exhaust branch pipes 5a to their merge portion, the shape of a portion of the exhaust passage 7 at the upstream side of the three-way catalyst 10, and so on, there occurs such a phenomenon that the flow rate of the exhaust gas flowing into the three-way catalyst becomes relatively large in some portions of the cross section of the three-way catalyst 10 (i.e., the flow speed of incoming exhaust gas is relatively large), and relatively small in the other portions thereof (i.e., the flow speed of the incoming exhaust gas is relatively small). In other words, in the three-way catalyst 10, a deviation or shift will occur on a cross section thereof in the distribution of the flow speed (or the distribution of the flow rate) of the exhaust gas discharged from each cylinder. Then, the degree of deviation of the distribution of the flow speed of the exhaust gas at this time is different from cylinder to cylinder. That is, in the internal combustion engine 1, the degree of uniformity of the flow speed distribution of the exhaust gas are different from cylinder to cylinder.

Then, in the internal combustion engine 1, when the air fuel ratio dither control is carried out, the same one cylinder(s) among the first cylinder through the fourth cylinder always becomes the lean cylinder(s), and the same other cylinder(s) among the first cylinder through the fourth cylinder always becomes the rich cylinder(s), as mentioned above. At this time, if the air fuel ratio dither control is carried out by setting, as the lean cylinder, a cylinder with a relatively low degree of uniformity of the flow speed distribution of the exhaust gas, the exhaust gas of a lean air fuel ratio discharged from the lean cylinder is hard to expand in a diametral or radial direction of the three-way catalyst 10. For that reason, the exhaust gas of the lean air fuel ratio discharged from the lean cylinder becomes easy to flow relatively intensively through a specific portion on the cross section of the three-way catalyst 10 during the execution of the air fuel ratio dither control. As a result, even if the average exhaust gas air fuel ratio is controlled to the target exhaust gas air fuel ratio as a whole of the incoming exhaust gas, the average exhaust gas air fuel ratio during the execution of the air fuel ratio dither control will shift to the lean side with respect to the target exhaust gas air fuel ratio, in the portion in the three-way catalyst 10 in which the exhaust gas of the lean air fuel ratio flows relatively intensively. In other words, the partial lean shift of the air fuel ratio of exhaust gas will occur.

Here, the relation between the NOx, HC and CO purification rates in the three-way catalyst and the exhaust gas air fuel ratio will be explained based on FIG. 4. In FIG. 4, the axis of abscissa represents the exhaust gas air fuel ratio, and the axis of ordinate represents the NOx, HC and CO purification rates in the three-way catalyst. Then, a predetermined region of the exhaust gas air fuel ratio shown by a diagonally shaded area in FIG. 4 indicates a purification window in which both of the NOx reduction ratio and the HC and CO purification rates in the three-way catalyst become suitable values. As shown in FIG. 4, the predetermined region containing the stoichiometric air fuel ratio (A/F=14.6) therein becomes the purification window of the three-way catalyst. For that reason, when the partial lean shift of the air fuel ratio of exhaust gas occurs in a portion of the three-way catalyst during the execution of the air fuel ratio dither control, when the average exhaust gas air fuel ratio will become out of the purification window in that portion of the three-way catalyst, it will become difficult to reduce NOx to a sufficient extent. As a result, the NOx purification (reduction) rate in the three-way catalyst as a whole will decrease.

Accordingly, in this embodiment, when the air fuel ratio dither control is carried out in the internal combustion engine 1, the ECU 20 carries out the air fuel ratio dither control so as to suppress the partial lean shift of the air fuel ratio of exhaust gas, by setting, as the rich cylinder, a cylinder with the lowest degree of uniformity of the flow speed distribution of the exhaust gas among the first cylinder through the fourth cylinder. According to this, it is possible to suppress the exhaust gas of the lean air fuel ratio from flowing intensively through the specific portion on the cross section of the three-way catalyst 10, in comparison with the case where the air fuel ratio dither control is carried out by setting, as the lean cylinder, the cylinder with the lowest degree of uniformity of the flow speed distribution of the exhaust gas. For that reason, the partial lean shift of the air fuel ratio of the exhaust gas becomes hard to occur in the three-way catalyst 10. Accordingly, it is possible to suppress a decrease in the NOx removal or reduction rate in the three-way catalyst 10 in the course of the execution of the air fuel ratio dither control.

Here, note that when the air fuel ratio dither control is carried out in the internal combustion engine 1, when the air fuel ratio dither control is carried out by setting, as the rich cylinder, the cylinder with the lowest degree of uniformity of the flow speed distribution of the exhaust gas among the first cylinder through the fourth cylinder, the exhaust gas of the rich air fuel ratio discharged from the rich cylinder becomes easy to flow intensively through a specific portion on the cross section of the three-way catalyst 10, contrary to the case where the air fuel ratio dither control is carried out by setting, as the lean cylinder, the cylinder with the lowest degree of uniformity of the flow speed distribution of the exhaust gas. For that reason, even if the average air fuel ratio is controlled to the target exhaust gas air fuel ratio as a whole of the incoming exhaust gas at the time of the execution of the air fuel ratio dither control, there can occur a location in the three-way catalyst 10 in which the average exhaust gas air fuel ratio of exhaust gas flowing there partially shifts to the rich side with respect to the target exhaust gas air fuel ratio (hereinafter, such a state may be referred to as a "partial rich shift of the air fuel ratio of exhaust gas"). However, as shown in FIG. 4, the degree of decrease in each of the HC and CO purification (removal or oxidation) rates in the three-way catalyst in the case where the air fuel ratio of the incoming exhaust gas has shifted to the rich side with respect to the stoichiometric air fuel ratio and has become out of the purification window is smaller than the degree of decrease in the NOx purification (removal or reduction) rate in the three-way catalyst in the case where the air fuel ratio of the incoming exhaust gas has shifted to the lean side with respect to the stoichiometric air fuel ratio and has become out of the purification window. Accordingly, in this embodiment, even if the partial rich shift of the air fuel ratio of the incoming exhaust gas has occurred in the three-way catalyst 10 during the execution of the air fuel ratio dither control, an overall influence with respect to the exhaust gas purification in the three-way catalyst 10 is smaller than in the case where the partial lean shift of the air fuel ratio of the incoming exhaust gas has occurred. Thus, in this embodiment, priority is given to the suppression of the partial lean shift of the air fuel ratio in the three-way catalyst 10 over the suppression of the partial rich shift of the air fuel ratio in the three-way catalyst 10, during the execution of the air fuel ratio dither control.

(Degree of Uniformity of the Flow Speed Distribution of Exhaust Gas)

In this embodiment, the relative relation among the flow speed distributions of exhaust gases from the individual cylinders in the internal combustion engine 1 has been obtained by simulations. Then, it has been decided in advance based on the relative relation among the flow speed distributions of exhaust gases obtained by the simulations that at the time of carrying out the air fuel ratio dither control, which cylinder in the first cylinder through the fourth cylinder in the internal combustion engine 1 becomes the lean cylinder, and which cylinder in the first cylinder through the fourth cylinder in the internal combustion engine 1 becomes the rich cylinder. Here, the relative relation among the flow speed distributions of exhaust gases from the individual cylinders of the internal combustion engine 1 will be explained based on FIGS. 5 and 6.

FIGS. 5 and 6 are views each showing the relative relation among the flow speed distributions of exhaust gases from the individual cylinders 2 of the internal combustion engine 1. Here, the degree of uniformity of the flow speed distribution of exhaust gas is obtained by first calculating the flow speed distribution of exhaust gas on the cross section of the three-way catalyst 10 by means of a simulation such as CFD (Computational Fluid Dynamics), and then using the following equation 1.

$$\gamma = 1 - \frac{1}{2n}\Sigma\frac{\sqrt{(W_i - W_{mean})^2}}{W_{mean}} \quad \text{equation 1}$$

$\gamma$: the degree of uniformity of the flow speed distribution of exhaust gas n: the number of measuring points (calculation points) for simulation $W_i$: the flow speed of the exhaust gas in each measuring point for simulation (the flow speed in the axial direction of the exhaust passage 7)

$W_{mean}$: an average (mean) value of $W_i$

In addition, $W_{mean}$, which is an average value of $W_i$, can be calculated by the following equation 2.

$$W_{mean} = \Sigma(W_i \times \Delta V_i)\Sigma\Delta V_i \quad \text{equation 2}$$

$\Delta V_i$: an area of each measuring point for simulation

The degree of uniformity $\gamma$ of the distribution of the flow speed of the exhaust gas calculated by the above-mentioned equation 1 is a value equal to or smaller than 1. Then, it is shown that as the value of $\gamma$ is larger (i.e., closer to 1), the flow speed distribution of exhaust gas on the cross section of the three-way catalyst 10 is in a more uniform state.

FIG. 5 shows differences, among cylinders, of the degrees of uniformity $\gamma$ of the distributions of the flow speeds of exhaust gases in the internal combustion engine calculated by the above-mentioned equation 1. In FIG. 5, the axis of abscissa represents an amount of intake air Aair in the internal combustion engine 1. Here, note that a range of A1 to A6 in the axis of abscissa corresponds to a range of the amount of intake air in the operating region of the internal combustion engine 1 in which the air fuel ratio dither control is carried out. Also, in FIG. 5, the axis of ordinate represents the degree of uniformity $\gamma$ of the flow speed distribution of exhaust gas for each cylinder in each amount of intake air. That is, in FIG. 5, round marks indicate the degree of uniformity of the flow speed distribution of the exhaust gas for the first cylinder. In addition, square marks indicate the degree of uniformity of the flow speed distribution of the exhaust gas for the second cylinder. Moreover, triangle marks indicate the degree of uniformity of the flow speed distribution of the exhaust gas for the third cylinder. Further, x marks indicate the degree of uniformity of the flow speed distribution of the exhaust gas for the fourth cylinder. Then, FIG. 6 shows an average value $A\gamma$ of the degree of uniformity of the flow speed distribution of exhaust gas for each cylinder, when the amount of intake air in the internal combustion engine 1 is in the range from A1 to A6 in FIG. 5 (hereinafter, this may simply be referred to as an average value $A\gamma$ of the degree of uniformity of the flow speed distribution of exhaust gas). In FIG. 6, the axis of ordinate represents the average value $A\gamma$ of the degree of uniformity of the flow speed distribution of the exhaust gas.

In this embodiment, the relative relation among the degrees of uniformity of the flow speed distributions of exhaust gases in the first cylinder through the fourth cylinder of the internal combustion engine 1 is defined based on the average value $A\gamma$ of the degree of uniformity of the flow speed distribution of exhaust gas for each cylinder, as shown in FIG. 6. For that reason, the relative relation among the degrees of uniformity of the flow speed distributions of exhaust gases in the first cylinder through the fourth cylinder of the internal combustion engine 1 is defined, as shown in FIG. 7. In other words, in this embodiment, it is defined that the degree of uniformity of the flow speed distribution of the exhaust gas becomes lower (decreases) in order of the second cylinder, the fourth cylinder, the first cylinder, and the third cylinder.

Then, as mentioned above, in this embodiment, when air fuel ratio dither control is carried out in the internal combustion engine 1, it is carried out by setting, as the rich cylinder, a cylinder with the lowest degree of uniformity of the flow speed distribution of the exhaust gas. In other words, in the internal combustion engine 1, the air fuel ratio dither control is carried out by setting the third cylinder as the rich cylinder. Moreover, in this embodiment, whether a cylinder other than the third cylinder is set as the lean cylinder or the rich cylinder at the time of carrying out the air fuel ratio dither control is decided by taking account of the combustion order (firing order) of the individual cylinders, the number of cylinders to be set as the lean cylinder, and the number of cylinders to be set as the rich cylinder, in addition to the relative relation of the degrees of uniformity of the flow speed distributions of the exhaust gases. Hereinafter, specific examples of assignment of the lean cylinder and the rich cylinder at the time of carrying out the air fuel ratio dither control in the internal combustion engine 1 will be explained based on FIGS. 8 through 11. Here, note that in this embodiment, the assignment of the lean cylinder and the rich cylinder as shown in FIGS. 8 through 11 has been stored in the ECU 20 in advance. Then, based on the assignment thus stored, the ECU 20 carries out the air fuel ratio dither control by setting a part of the cylinders as the lean cylinder(s), and a part of the other cylinders as the rich cylinder(s). With this, when the air fuel ratio dither control is carried out, the same one cylinder(s) among the first cylinder through the fourth cylinder always becomes the lean cylinder(s), and the same other cylinder(s) among the first cylinder through the fourth cylinder always becomes the rich cylinder(s).

Specific Example 1

FIG. 8 is a view showing the assignment of the lean cylinder and the rich cylinder in the air fuel ratio dither control in the internal combustion engine 1 in the case of repeating combustion in the lean cylinder, and combustion in the rich cylinder in an alternate manner cylinder by cylinder. In this case, the third cylinder, which is a cylinder with the lowest degree of uniformity of the flow speed distribution of exhaust gas, is assigned to the rich cylinder, so that whether the other cylinders are to be assigned to the lean cylinder or the rich cylinder will be necessarily decided according to the combustion order in the internal combustion engine 1. In this embodiment, as shown in FIG. 8, the combustion order in the internal combustion engine 1 is as follows: the first cylinder, the third cylinder, the fourth cylinder, and the second cylinder. Accordingly, in this specific example 1, as shown in FIG. 8, the air fuel ratio dither control is carried out by assigning the second cylinder and the third cylinder as the rich cylinders, and by assigning the first cylinder and the fourth cylinder as the lean cylinders.

Specific Example 2

FIG. 9 is a view showing the assignment of the lean cylinder and the rich cylinder in the case of carrying out the air fuel ratio dither control by assigning only one cylinder as the rich cylinder, and the other three cylinders as the lean cylinders, in the internal combustion engine 1. In this case, the third cylinder, which is a cylinder with the lowest degree of uniformity of the flow speed distribution of exhaust gas, is assigned to the rich cylinder, so that the other cylinders will be necessarily assigned to the lean cylinders. That is, in this specific example 2, as shown in FIG. 9, the air fuel ratio dither control is carried out by assigning the third cylinder as the rich cylinder, and by assigning the other cylinders as the lean cylinders.

Specific Example 3

FIG. 10 is a view showing the assignment of the lean cylinder and the rich cylinder in the case of carrying out the air fuel ratio dither control by assigning two cylinders comprising a sequential combustion order as the rich cylinders, and by assigning the other two cylinders comprising a sequential combustion order as the lean cylinders, in the internal combustion engine 1. In this case, the third cylinder with the lowest degree of uniformity of the flow speed distribution of exhaust gas is assigned to the rich cylinder, so that either the first cylinder, of which the combustion order is immediately preceding (before) the third cylinder, or the fourth cylinder, of which the combustion order is immediately succeeding (after) the third cylinder, will be assigned to the rich cylinder. In such a case, the one of the first cylinder and the fourth cylinder, of which the degree of uniformity of the flow speed distribution of exhaust gas is lower than that of the other, may be assigned to the rich cylinder. In other words, in this specific example 3, as shown in FIG. 10, the air fuel ratio dither control is carried out, by assigning as the rich cylinders the third cylinder and one of the first cylinder and the fourth cylinder, of which the degree of uniformity of the flow speed distribution of exhaust gas is lower than that of the other, i.e., the first cylinder, and by assigning as the lean cylinders the remaining cylinders, i.e., the fourth cylinder and the second cylinder.

Moreover, when the air fuel ratio dither control is carried out by assigning two cylinders as the rich cylinders, and the other two cylinders as the lean cylinders in the internal combustion engine 1, irrespective of the combustion order, cylinders may be assigned to the rich cylinders, preferentially in order from the low to high degrees of uniformity of the flow speed distributions of exhaust gases. In the internal combustion engine 1 according to this embodiment, as shown in FIG. 7, the degree of uniformity of the flow speed distribution of exhaust gas for the first cylinder is the second lowest. For that reason, even if two cylinders are assigned to the rich cylinders in order from the low to high degrees of uniformity of the flow speed distributions of exhaust gases irrespective of the combustion order, the third cylinder and the first cylinder are assigned to the rich cylinders, and the fourth cylinder and the second cylinder are assigned to the lean cylinders, similar to FIG. 10.

Specific Example 4

FIG. 11 is a view showing the assignment of the lean cylinder and the rich cylinder in the case of carrying out the air fuel ratio dither control by assigning three cylinders as the rich cylinders, and the remaining one cylinder as the lean cylinder, in the internal combustion engine 1. In this case, too, three cylinders may be assigned to the rich cylinders in order from the low to high degrees of uniformity of the flow speed distributions of exhaust gases. That is, in this specific example 4, as shown in FIG. 11, the air fuel ratio dither control is carried out by assigning as the lean cylinder the second cylinder, of which the degree of uniformity of the flow speed distribution of exhaust gas is the highest, and by assigning the other cylinders as the rich cylinders.

As in the case of the above-mentioned specific examples 3 and 4, when the air fuel ratio dither control is carried out by assigning or setting two or more of the four cylinders as the rich cylinders, the cylinders with the lower degrees of uniformity of the flow speed distributions of exhaust gases are preferentially assigned to the rich cylinders, so that in the course of the execution of the air fuel ratio dither control, it is possible to suppress the exhaust gas of the lean air fuel ratio from flowing intensively through the specific portion on the cross section of the three-way catalyst 10 to a further extent. For that reason, the partial lean shift of the air fuel ratio of the exhaust gas becomes harder to occur in the three-way catalyst 10. Accordingly, it is possible to suppress a decrease in the NOx removal or reduction rate in the three-way catalyst 10 in the course of the execution of the air fuel ratio dither control to a further extent.

Further, in FIGS. 10 and 11, the third cylinder with the lowest degree of uniformity of the flow speed distribution of exhaust gas is assigned to the rich cylinder, and at the same time, the second cylinder with the highest degree of uniformity of the flow speed distribution of exhaust gas is assigned to the lean cylinder. According to this, in comparison with the case where the second cylinder with the highest degree of uniformity of the flow speed distribution of exhaust gas is assigned to the rich cylinder, and either one or both of the remaining first and fourth cylinders are assigned to the lean cylinders, a partial lean shift of the air fuel ratio of exhaust gas becomes harder to occur. Accordingly, it becomes possible to suppress a decrease in the NOx removal or reduction rate in the three-way catalyst 10 in the course of the execution of the air fuel ratio dither control to a further extent.

Here, note that, as mentioned above, in this embodiment, the average value $A\gamma$ of the degree of uniformity of the flow speed distribution of exhaust gas is set to an average value of the degree of uniformity of the flow speed distribution of exhaust gas for each cylinder, when the amount of intake air in the internal combustion engine 1 is in the range from A1 to A6 in FIG. 5, i.e., in the entire range of the amount of intake air in the operating region of the internal combustion engine 1 in which the air fuel ratio dither control is carried out. Then, the relative relation between the degrees of uniformity of the flow speed distributions of exhaust gases in the first cylinder through the fourth cylinder of the internal combustion engine 1 has been defined, based on this average value Aγ of the degree of uniformity of the flow speed distribution of exhaust gas. However, the average value Aγ of the degree of uniformity of the flow speed distribution of exhaust gas may be set to an average value of the degree of uniformity of the flow speed distribution of exhaust gas for each cylinder, in a part of the entire range of the amount of intake air in the operating region of the internal combustion engine 1 in which the air fuel ratio dither control is carried out. Here, there is a tendency that the difference in the average value of the degree of uniformity of the flow speed distribution of exhaust gas for each cylinder is easy to become larger, as the amount of intake air in the internal combustion engine 1 increases. For that reason, it is preferable to adopt, as the average value Aγ of the degree of uniformity of the flow speed distribution of exhaust gas, an average value of the degree of uniformity of the flow speed distribution of exhaust gas for each cylinder in a partial range including an upper limit value (i.e., A6 in FIG. 5) in the range of the amount of intake air in the operating region of the internal combustion engine 1 in which the air fuel ratio dither control is carried out.

(Maximum Flow Speed of Exhaust Gas)

As described above, the degree of uniformity of the flow speed distribution of exhaust gas for each cylinder 2 is obtained by first calculating the flow speed distribution of exhaust gas on the cross section of the three-way catalyst 10 by means of a simulation such as CFD, and then using the above-mentioned equation 1. Here, the degree of uniformity of the flow speed distribution of the exhaust gas has a correlation with a maximum flow speed of the exhaust gas on the cross section of the three-way catalyst 10 (hereinafter, this may be referred to simply as a "maximum flow speed of the exhaust gas"). In other words, the lower the degree of uniformity of the flow speed distribution of the exhaust gas, the more intensively the exhaust gas flows in a specific portion on the cross section of the three-way catalyst 10, and so, the larger the maximum flow speed of the exhaust gas tends to become. Accordingly, the correlation between the maximum flow speeds of exhaust gases for the individual cylinders may be obtained, in place of the correlation between the degrees of uniformity of the flow speed distributions of exhaust gases for the individual cylinders. Then, the assignment of the lean cylinder and the rich cylinder at the time of carrying out the air fuel ratio dither control in the internal combustion engine 1 may be decided based on the correlation between the maximum flow speeds of exhaust gases for the individual cylinders.

FIGS. 12 and 13 are views each showing the relative relation among the maximum flow speeds of exhaust gases from the individual cylinders 2 of the internal combustion engine 1. FIG. 12 shows the differences of the maximum flow speeds Vgmax of exhaust gases for individual cylinders. In FIG. 12, the axis of abscissa represents the amount of intake air Aair in the internal combustion engine 1. Here, note that, similar to FIG. 5, the range of A1 to A6 in the axis of abscissa corresponds to a range of the amount of intake air in the operating region of the internal combustion engine 1 in which the air fuel ratio dither control is carried out. Also, in FIG. 12, the axis of ordinate represents the maximum flow speed Vgmax of exhaust gas for each cylinder in each amount of intake air. That is, in FIG. 12, round marks indicate the maximum flow speed of the exhaust gas for the first cylinder. In addition, square marks indicate the maximum flow speed of the exhaust gas for the second cylinder. Moreover, triangle marks indicate the maximum flow speed of the exhaust gas for the third cylinder. Further, x marks indicate the maximum flow speed of the exhaust gas for the fourth cylinder. Then, FIG. 13 shows an average value AVgmax of the maximum flow speed of exhaust gas for each cylinder, when the amount of intake air in the internal combustion engine 1 is in the range from A1 to A6 in FIG. 12 (hereinafter, this may simply be referred to as an average value AVgmax of the maximum flow speed of exhaust gas). In FIG. 13, the axis of ordinate represents the average value AVgmax of the maximum flow speed of exhaust gas.

Then, when the relative relation among the maximum flow speeds of exhaust gases in the first cylinder through the fourth cylinder of the internal combustion engine 1 is defined based on the average value AVgmax of the maximum flow speed of exhaust gas for each cylinder, as shown in FIG. 13, this relative relation will be defined, as shown in FIG. 14. In other words, in this second embodiment, it is defined that the maximum flow speeds of exhaust gases becomes lower (decreases) in order of the third cylinder, the first cylinder, the fourth cylinder, and the second cylinder. Thus, in this embodiment, the order of the maximum flow speeds of the exhaust gases in the first cylinder through the fourth cylinder is opposite to the order of the degrees of uniformity of the flow speed distributions of exhaust gases. Then, in cases where the assignment of the lean cylinder and the rich cylinder at the time of carrying out the air fuel ratio dither control is decided based on the correlation among the maximum flow speeds of exhaust gases for the individual cylinders, in this embodiment, at least the third cylinder, which is a cylinder with the largest maximum flow speed of exhaust gas, will be assigned to the rich cylinder, as shown in FIGS. 8 through 11.

In addition, in cases where the lean cylinder(s) and the rich cylinder(s) are assigned as shown in FIGS. 10 and 11, cylinders with larger maximum flow speeds of exhaust gases will be preferentially assigned to the rich cylinders, and cylinders with smaller maximum flow speeds of exhaust gas will be preferentially assigned to the lean cylinder(s). More specifically, as shown in FIG. 10, in the case of carrying out the air fuel ratio dither control by assigning two cylinders comprising a sequential combustion order as rich cylinders, and by assigning the other two cylinders comprising a sequential combustion order as the lean cylinders, in the internal combustion engine 1, the third cylinder with the largest maximum flow speed of exhaust gas is assigned to the rich cylinder, so that either the first cylinder, of which the combustion order is immediately preceding (before) the third cylinder, or the fourth cylinder, of which the combustion order is immediately succeeding (after) the third cylinder, will be assigned to the rich cylinder. In such a case, among these first and fourth cylinders, the first cylinder, of which the maximum flow speed of exhaust gas is larger than that of the fourth cylinder, may be assigned to the rich cylinder.

Moreover, when the air fuel ratio dither control is carried out by assigning two cylinders as the rich cylinders, and the other two cylinders as the lean cylinders in the internal combustion engine 1, irrespective of the combustion order, cylinders may be assigned to the rich cylinders, preferentially in order from the large to small maximum flow speeds of exhaust gases. In the internal combustion engine 1 according to this embodiment, as shown in FIG. 14, the maximum flow speed of exhaust gas for the first cylinder is the second largest. For that reason, even if two cylinders are assigned to the rich cylinders in order from the large to small maximum flow speeds of exhaust gases irrespective of the combustion order, the third cylinder and the first cylinder are assigned to the rich cylinders, and the fourth cylinder and the second cylinder are assigned to the lean cylinders, similar to FIG. 10.

Further, as shown in FIG. 11, when the air fuel ratio dither control is carried out by assigning three cylinders as the rich cylinders, and the remaining one cylinder as the lean cylinder in the internal combustion engine 1, irrespective of the combustion order, three cylinders may be assigned to the rich cylinders, in order from the large to small maximum flow speeds of exhaust gases. In other words, only the second cylinder with the smallest maximum flow speed of exhaust gas may be assigned to the lean cylinder.

In this manner, because cylinders with larger maximum flow speeds of exhaust gases are preferentially assigned to the rich cylinders, each cylinder will be assigned to the rich cylinder or the lean cylinder, in the same tendency as in the case where cylinders with lower degrees of uniformity of the flow speed distributions of exhaust gases are preferentially assigned to the rich cylinders. For this reason, in the course of the execution of the air fuel ratio dither control, it is possible to suppress the exhaust gas of the lean air fuel ratio from flowing intensively through the specific portion on the cross section of the three-way catalyst 10 to a further extent.

Second Embodiment

The schematic construction of an internal combustion engine and its intake and exhaust systems according to a second embodiment is the same as that in the first embodiment. In this second embodiment, a parameter for defining the relative relation among the degrees of uniformity of the flow speed distributions of exhaust gases in the first cylinder through the fourth cylinder of the internal combustion engine 1 is different from that in the above-mentioned first embodiment. In the first embodiment, the relative relation among the degrees of uniformity of the flow speed distributions of exhaust gases in the first cylinder through the fourth cylinder of the internal combustion engine 1 is defined based on the average value $A\gamma$ of the degree of uniformity of the flow speed distribution of exhaust gas for each cylinder, as shown in FIG. 6. On the other hand, in this second embodiment, the relative relation among the degrees of uniformity of the flow speed distributions of exhaust gases in the first cylinder through the fourth cylinder of the internal combustion engine 1 is defined based on a degree of uniformity of the flow speed distribution of exhaust gas at the time when the degree of uniformity $\gamma$ of the flow speed distribution of exhaust gas in each cylinder becomes a minimum value within the range of the amount of intake air in the operating region of the internal combustion engine 1 in which the air fuel ratio dither control is carried out (hereinafter, this may be referred to as a "minimum value of the degree of uniformity of the flow speed distribution of exhaust gas"). This is because it can also be thought that when the degree of uniformity $\gamma$ of the flow speed distribution of exhaust gas in each cylinder becomes a minimum value in the operating region of the internal combustion engine 1 in which the air fuel ratio dither control is carried out, the degrees of uniformity of the flow speed distributions of exhaust gases, which are different from cylinder to cylinder, give the greatest influence to a partial average air fuel ratio of exhaust gas in the three-way catalyst 10.

FIG. 15 is a view similar to FIG. 5. That is, FIG. 15 is a view showing differences, among cylinders, of the degrees of uniformity $\gamma$ of the flow speed distributions of exhaust gases in the internal combustion engine 1. Then, in FIG. 15, a value surrounded by a circle of an alternate long and short dash line indicates a minimum value of the degree of uniformity of the flow speed distribution of exhaust gas in each cylinder.

As shown in FIG. 15, the minimum value of the degree of uniformity of the flow speed distribution of exhaust gas from the first cylinder is smaller than the minimum value of the degree of uniformity of the flow speed distribution of exhaust gas from the third cylinder. For that reason, in cases where the relative relation among the degrees of uniformity of the flow speed distributions of exhaust gases in the first cylinder through the fourth cylinder of the internal combustion engine 1 is defined based on the minimum values of the degrees of uniformity of the flow speed distributions of exhaust gases, this relative relation becomes as shown in FIG. 16. In other words, in this second embodiment, it is defined that the degrees of uniformity of the flow speed distributions of exhaust gases become lower (decreases) in order of the second cylinder, the fourth cylinder, the third cylinder, and the first cylinder.

Then, in this second embodiment, too, the relation between the assignment of the lean cylinders and the rich cylinders at the time of carrying out the air fuel ratio dither control in the internal combustion engine 1 and the relative relation among the degrees of uniformity of the flow speed distributions of exhaust gases becomes the same as that in the first embodiment. That is, in the case of carrying out the air fuel ratio dither control in the internal combustion engine 1, this air fuel ratio dither control is carried out by setting, as the rich cylinder, at least the first cylinder which is a cylinder with the lowest degree of uniformity of the flow speed distribution of exhaust gas. Moreover, whether cylinders other than the first cylinder are each set as the lean cylinder or the rich cylinder at the time of carrying out the air fuel ratio dither control is decided by taking account of the combustion order (firing order) of the individual cylinders, the number of cylinders to be set as the lean cylinder(s) and the number of cylinders to be set as the rich cylinder(s), in addition to the relative relation among the degrees of uniformity of the flow speed distributions of exhaust gases for the individual cylinders, similar to the individual specific examples in the first embodiment.

Here, as shown in FIG. 16, this second embodiment is different from the first embodiment in the following definition. That is, it is defined that a cylinder with the lowest degree of uniformity of the flow speed distribution of exhaust gas is the first cylinder, and a cylinder with the second lowest degree of uniformity of the flow speed distribution of exhaust gas is the third cylinder (in the first embodiment, as shown in FIG. 7, it is defined that a cylinder with the lowest degree of uniformity of the flow speed distribution of exhaust gas is the third cylinder, and a cylinder with the second lowest degree of uniformity of the flow speed distribution of exhaust gas is the first cylinder). For that reason, as in the specific example 1 of the first embodiment, the assignment of the lean cylinder and the rich cylinder in the internal combustion engine 1 in the case of repeating the combustion in the lean cylinder and the combustion in the rich cylinder in an alternate manner cylinder by cylinder is different from that in FIG. 8, and becomes as shown in FIG. 17. That is, in this case, the air fuel ratio dither control will be carried out by assigning the first cylinder and the fourth cylinder as the rich cylinders, and by assigning the third cylinder and the second cylinder as the lean cylinders.

In addition, as in the specific example 2 of the first embodiment, the assignment of the lean cylinder and the rich cylinder in the internal combustion engine 1 in the case of carrying out the air fuel ratio dither control by assigning only one cylinder as the rich cylinder and the remaining three cylinders as the lean cylinders becomes as shown in FIG. 18, unlike that shown in FIG. 9. That is, in this case, the air fuel ratio dither control will be carried out by assigning only the first cylinder as the rich cylinder, and by assigning the other cylinders as the lean cylinders. Here, note that in cases where the first through fourth cylinders are each assigned to the lean cylinder or the rich cylinder, as in the specific examples 3 and 4 in the first embodiment, in this second embodiment, too, the assignment of the lean cylinders and the rich cylinders becomes the same as the assignment shown in each of FIGS. 10 and 11.

Moreover, when the degree of uniformity γ of the flow speed distribution of exhaust gas becomes a minimum value, in the range of the amount of intake air in the operating region of the internal combustion engine 1 in which the air fuel ratio dither control is carried out, the maximum flow speed of the exhaust gas tends to become a maximum value. FIG. 19 shows the differences of the maximum flow speeds Vgmax of exhaust gases for the individual cylinders, similar to FIG. 12. Then, in FIG. 19, a value surrounded by a circle of an alternate long and short dash line indicates a maximum value of the maximum flow speed of exhaust gas in each cylinder. As shown in FIG. 19, the maximum value of the maximum flow speed of the exhaust gas from the first cylinder is larger than the maximum value of the maximum flow speed of the exhaust gas from the third cylinder. For that reason, in cases where the relative relation among the maximum flow speeds of exhaust gases in the first cylinder through the fourth cylinder of the internal combustion engine 1 is defined based on the maximum values of the maximum flow speeds of exhaust gases, this relative relation becomes as shown in FIG. 20. In other words, in this second embodiment, in cases where the relative relation among the maximum flow speeds of exhaust gases in the first cylinder through the fourth cylinder of the internal combustion engine 1 is defined based on the maximum values of the maximum flow speeds of exhaust gases, the order of the maximum flow speeds of the exhaust gases in the first cylinder through the fourth cylinder is opposite to the order of the degrees of uniformity of the flow speed distributions of exhaust gases shown in FIG. 16. Then, in this second embodiment, too, a cylinder with the largest maximum flow speed of exhaust gas (i.e., the first cylinder) will be assigned to the rich cylinder at the time of carrying out the air fuel ratio dither control. In addition, whether cylinders other than the first cylinder are each set as the lean cylinder or the rich cylinder at the time of carrying out the air fuel ratio dither control is decided by taking account of the combustion order (firing order) of the individual cylinders, the number of cylinders to be set as the lean cylinder and the number of cylinders to be set as the rich cylinder, in addition to the relative relation among the maximum flow speeds of exhaust gases for the individual cylinders, as in the case of the first embodiment.

Third Embodiment

The schematic construction of an internal combustion engine and its intake and exhaust systems according to a third embodiment is the same as that in the first embodiment. In this third embodiment, a parameter for defining the relative relation among the degrees of uniformity of the flow speed distributions of exhaust gases in the first cylinder through the fourth cylinder of the internal combustion engine 1 is different from that in the above-mentioned first and second embodiments. In this third embodiment, the relative relation among the degrees of uniformity of the flow speed distributions of exhaust gases in the first cylinder through the fourth cylinder of the internal combustion engine 1 is defined based on a degree of uniformity of the flow speed distribution of exhaust gas at the time when the amount of intake air is an upper limit value within the range of the amount of intake air in the operating region of the internal combustion engine 1 in which the air fuel ratio dither control is carried out (hereinafter, this may also be referred to as a "degree of uniformity of the flow speed distribution of exhaust gas at the upper limit of the amount of intake air"). This is because it can also be thought that when the amount of intake air is an upper limit value in the operating region of the internal combustion engine 1 in which the air fuel ratio dither control is carried out, the degrees of uniformity of the flow speed distributions of exhaust gases, which are different from cylinder to cylinder, give the greatest influence to a partial average air fuel ratio of exhaust gas in the three-way catalyst 10.

FIG. 21 is a view similar to FIG. 5. That is, FIG. 15 is a view showing differences, among cylinders, of the degrees of uniformity γ of the flow speed distributions of exhaust gases in the internal combustion engine 1. Then, in FIG. 21, values surrounded by a circle of an alternate long and short dash line indicate the degrees of uniformity of the flow speed distributions of exhaust gases at the upper limit of the amount of intake air in the individual cylinders, respectively.

As shown in FIG. 21, the degree of uniformity of the flow speed distribution of exhaust gas at the upper limit of the amount of intake air in the third cylinder is smaller than the degree of uniformity of the flow speed distribution of exhaust gas at the upper limit of the amount of intake air in the first cylinder. For that reason, in cases where the relative relation among the degrees of uniformity of the flow speed distributions of exhaust gases in the first cylinder through the fourth cylinder of the internal combustion engine 1 is defined based on the degrees of uniformity of the flow speed distributions of exhaust gases at the upper limit of the amount of intake air, this relative relation is defined similarly to the relative relation in the first embodiment shown in FIG. 7. In other words, in this third embodiment, it is defined that the degree of uniformity of the flow speed distribution of the exhaust gas becomes lower (decreases) in order of the second cylinder, the fourth cylinder, the first cylinder, and the third cylinder.

Then, in this third embodiment, too, the relation between the assignment of the lean cylinder and the rich cylinder at the time of carrying out the air fuel ratio dither control in the internal combustion engine 1 and the relative relation among the degrees of uniformity of the flow speed distributions of exhaust gases becomes the same as that in the first embodiment. That is, in the case of carrying out the air fuel ratio dither control in the internal combustion engine 1, this air fuel ratio dither control is carried out by setting, as the rich cylinder, at least the third cylinder which is a cylinder with the lowest degree of uniformity of the flow speed distribution of exhaust gas. Moreover, whether cylinders other than the third cylinder are each set as the lean cylinder or the rich cylinder at the time of carrying out the air fuel ratio dither control is decided by taking account of the combustion order (firing order) of the individual cylinders, the number of cylinders to be set as the lean cylinder and the number of cylinders to be set as the rich cylinder, in addition to the relative relation among the degrees of uniformity of the flow speed distributions of exhaust gases for the individual cylinders, similar to the individual specific examples in the first embodiment. At this time, in cases where the first through fourth cylinders are each assigned to the lean cylinder or the rich cylinder, as in the specific examples 1 through 4 in the first embodiment, in this third embodiment, too, the assignment of the lean cylinder and the rich cylinder becomes the same as the assignment shown in each of FIGS. 8 through 11.

Further, the relative relation among the maximum flow speeds of exhaust gases in the first cylinder through the fourth cylinder of the internal combustion engine 1 may be defined based on a maximum flow speed of the exhaust gas at the time when the amount of intake air is an upper limit value within the range of the amount of intake air in the operating region of the internal combustion engine 1 in which the air fuel ratio dither control is carried out. FIG. 22 shows the differences of the maximum flow speeds Vgmax of exhaust gases for the individual cylinders, similar to FIG. 12. Then, in FIG. 21, values surrounded by a circle of an alternate long and short dash line indicate the maximum flow speeds of exhaust gases at the upper limit of the amount of intake air in the individual cylinders, respectively. In this manner, in cases where the relative relation among the maximum flow speeds of exhaust gases in the first cylinder through the fourth cylinder of the internal combustion engine 1 is defined based on a maximum flow speed of the exhaust gas at the time when the amount of intake air is an upper limit value within the range of the amount of intake air in the operating region of the internal combustion engine 1 in which the air fuel ratio dither control is carried out, the order of the maximum flow speeds of the exhaust gases in the first cylinder through the fourth cylinder is opposite to the order of the degrees of uniformity of the flow speed distributions of exhaust gases shown in FIG. 7. In other words, the relative relation among the maximum flow speeds of exhaust gases in the the first cylinder through the fourth cylinder of the internal combustion engine 1 will be defined as shown in FIG. 14, similar to the relative relation among the maximum flow speeds of exhaust gases in the first embodiment. Then, in this third embodiment, too, a cylinder with the largest maximum flow speed of exhaust gas (i.e., the third cylinder) will be assigned to the rich cylinder at the time of carrying out the air fuel ratio dither control. In addition, whether cylinders other than the third cylinder are each set as the lean cylinder or the rich cylinder at the time of carrying out the air fuel ratio dither control is decided by taking account of the combustion order (firing order) of the individual cylinders, the number of cylinders to be set as the lean cylinder and the number of cylinders to be set as the rich cylinder, in addition to the relative relation among the maximum flow speeds of exhaust gases for the individual cylinders, as in the case of the first embodiment.

Modification

The exhaust gas purification system for an internal combustion engine according to the present disclosure can be applied not only to an engine comprising a single cylinder group including a plurality of cylinders, such as the internal combustion engine 1 shown in FIG. 1, but also to an engine comprising a plurality of cylinder groups. FIG. 23 is a diagram that shows the general configuration of an internal combustion engine and its exhaust system in the case where an exhaust gas purification system for an internal combustion engine according to the present disclosure is applied to a V type 8-cylinder gasoline engine.

An internal combustion engine 300 shown in FIG. 23 has a first cylinder group 310 and a second cylinder group 320. The first cylinder group 310 includes four cylinders (i.e., first through fourth cylinders) 312. The second cylinder group 320 also includes four cylinders (fifth through eighth cylinders) 322. The cylinders 312, 322 of the first and second cylinder groups 310, 320 are each provided with a spark plug 313 or a spark plug 323.

An exhaust manifold 315 is connected to the first cylinder group 310. The exhaust manifold 315 has exhaust branch pipes 315a connected to the individual cylinders 312 of the first cylinder group 310, respectively. Also, an exhaust manifold 325 is connected to the second cylinder group 320. The exhaust manifold 325 has exhaust branch pipes 325a connected to the individual cylinders 322 of the second cylinder group 320, respectively. In addition, an intake manifold is connected to each of the individual cylinder groups 310, 320, and the intake manifold has a plurality of intake branch pipes connected to the individual cylinders of the first and second cylinder groups 310, 320, with a fuel injection valve being arranged in each of the intake branch pipes, but an illustration of these parts is omitted.

Then, a merge portion of the individual exhaust branch pipes 315a of the exhaust manifold 315 connected to the first cylinder group 310 is connected to an exhaust passage 317. A first air fuel ratio sensor 311 is arranged on the exhaust passage 317 at its connection portion to the merge portion of the exhaust branch pipes 315a. In addition, a first three-way catalyst 318 is arranged on the exhaust passage 317 at the immediately downstream side of the first air fuel ratio sensor 311. Thus, the air fuel ratio of the exhaust gas flowing into the first three-way catalyst 318 is detected by the first air fuel ratio sensor 311. Moreover, a merge portion of the individual exhaust branch pipes 325a of the exhaust manifold 325 connected to the second cylinder group 320 is connected to an exhaust passage 327. A second air fuel ratio sensor 321 is arranged on the exhaust passage 327 at its connection portion to the merge portion of the exhaust branch pipes 325a. Further, a second three-way catalyst 328 is arranged on the exhaust passage 327 at the immediately downstream side of the second air fuel ratio sensor 321. Thus, the air fuel ratio of the exhaust gas flowing into the second three-way catalyst 328 is detected by the second air fuel ratio sensor 321. In other words, in the arrangement of the V type 8-cylinder gasoline engine according to this modification, the three-way catalysts 318, 328 and the air fuel ratio sensors 311, 321 are arranged in the exhaust passages 317, 327 corresponding to the cylinder groups 310, 320, respectively. In addition, in this arrangement, too, the detected values of the individual air fuel ratio sensors 311, 321 are inputted to an ECU (illustration omitted) that controls the operating state of the internal combustion engine 300, etc.

In the case of the arrangement as shown in FIG. 23, the air fuel ratio dither control is carried out in order to raise the individual temperatures of the three-way catalysts 318, 328. For that reason, in each of the cylinder groups 310, 320, the air fuel ratio dither control is carried out by assigning a part of the cylinders as the lean cylinder(s), and by assigning a part of the other cylinders as rich cylinder(s). Then, the air fuel ratio of a mixture in each of the lean cylinder(s) and the rich cylinder(s) in the first cylinder group 310 is controlled in a feedback manner based on an average value of a detected value of the first air fuel ratio sensor 311, so that an average value of an air fuel ratio of exhaust gas flowing into the first three-way catalyst 318 becomes a predetermined target exhaust gas air fuel ratio. In addition, the air fuel ratio of a mixture in each of the lean cylinder(s) and the rich cylinder(s) in the second cylinder group 320 is controlled in a feedback manner based on an average value of a detected value of the second air fuel ratio sensor 321, so that an average value of an air fuel ratio of exhaust gas flowing into the second three-way catalyst 328 becomes a predetermined target exhaust gas air fuel ratio.

Accordingly, the assignment of the lean cylinder and the rich cylinder at the time of carrying out the air fuel ratio dither control, as explained in each of the above-mentioned first through third embodiments, is applied to the assignment of the lean cylinder and the rich cylinder in each of the cylinder groups 310, 320. In other words, in the first cylinder group 310, a cylinder for which the degree of uniformity of the flow speed distribution of exhaust gas is the lowest among the first cylinder through the fourth cylinder is assigned to the rich cylinder, and in the second cylinder group 320, a cylinder for which the degree of uniformity of the flow speed distribution of exhaust gas is the lowest among the fifth cylinder through the eighth cylinder is assigned to the rich cylinder. In addition, in cases where the assignment of the lean cylinder and the rich cylinder at the time of carrying out the air fuel ratio dither control is decided based on the correlation among the maximum flow speeds of exhaust gases for the individual cylinders, in the first cylinder group 310, a cylinder for which the maximum flow speed of exhaust gas is the largest among the first cylinder through the fourth cylinder is assigned to the rich cylinder, and in the second cylinder group 320, a cylinder for which the maximum flow speed of exhaust gas is the largest among the fifth cylinder through the eighth cylinder is assigned to the rich cylinder.

In addition, whether the other cylinders in each of the first and second cylinder groups 310, 320 are set as the lean cylinder(s) or the rich cylinder(s) at the time of carrying out the air fuel ratio dither control is decided by taking account of the combustion order (firing order) of the individual cylinders in each of the first and second cylinder groups 310, 320, the number of cylinders to be set as the lean cylinder and the number of cylinders to be set as the rich cylinder in each of the first and second cylinder groups 310, 320, in addition to the relative relation among the degrees of uniformity of the flow speed distributions of exhaust gases for the individual cylinders in each of the first and second cylinder groups 310, 320, or the relative relation among the maximum flow speeds for the individual cylinders in each of the first and second cylinder groups 310, 320. At this time, the method of definition explained in the above-mentioned first through third embodiments can be applied to a specific method of definition of the relative relation among the degrees of uniformity of the flow speed distributions of exhaust gases for the individual cylinders in each of the first and second cylinder groups 310, 320, or the relative relation among the maximum flow speeds for the individual cylinders in each of the first and second cylinder groups 310, 320. Moreover, the way of cylinder assignment explained in the above-mentioned first through third embodiments can be applied to a specific way of assignment of the lean cylinder and the rich cylinder in each of the cylinder groups 310, 320.

What is claimed is:

1. An exhaust gas purification system for an internal combustion engine comprising a cylinder group including a plurality of cylinders, the system comprising:

a three-way catalyst that is arranged in an exhaust passage at the downstream side of a merge portion of exhaust branch pipes which are connected to individual cylinders of the cylinder group; and a controller comprising at least one processor configured to control an air fuel ratio of a mixture in a part of the cylinders of the cylinder group to a lean air fuel ratio leaner than a stoichiometric air fuel ratio, and controls an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in such a manner that an average value of an air fuel ratio of exhaust gas flowing into the three-way catalyst becomes a predetermined target exhaust gas air fuel ratio;

wherein the controller carries out the air fuel ratio dither control, by always setting same one or more cylinders in the cylinder group as the one or more lean cylinders, and by always setting other same one or more cylinders in the cylinder group as the one or more rich cylinders, and the controller further carries out the air fuel ratio dither control by setting, as the one or more rich cylinders, at least a cylinder for which a degree of uniformity of the flow speed distribution of exhaust gas, which is a degree of uniformity of the flow speed distribution of exhaust gas discharged from the cylinder on a cross section of the three-way catalyst, is the lowest in the cylinder group.

2. The exhaust gas purification system for an internal combustion engine as set forth in claim 1, wherein the controller further carries out the air fuel ratio dither control by setting, as the one or more lean cylinders, at least a cylinder for which the degree of uniformity of the flow speed distribution of exhaust gas is the highest in the cylinder group.

3. The exhaust gas purification system for an internal combustion engine as set forth in claim 1, wherein when the air fuel ratio dither control is carried out by setting, as the one or more rich cylinders, two or more of the plurality of cylinders in the cylinder group, the controller carries out the air fuel ratio dither control, by setting, as the one or more rich cylinders, cylinders in the cylinder group in ascending order of the degrees of uniformity of the flow speed distributions of exhaust gases from the lowest degree of uniformity of the flow speed distribution of exhaust gas.

4. The exhaust gas purification system for an internal combustion engine as set forth in claim 1, wherein when the air fuel ratio dither control is carried out by setting, as the one or more rich cylinders, two cylinders of which the order of combustion is continuous among the plurality of cylinders in the cylinder group, the controller carries out the air fuel ratio dither control, by setting, as the one or more rich cylinders, a cylinder with the lowest degree of uniformity of the flow speed distribution of exhaust gas in the cylinder group, and another cylinder for which the degree of uniformity of the flow speed distribution of exhaust gas is the lower of a cylinder of which the combustion order is immediately before the cylinder with the lowest degree of uniformity of the flow speed distribution of exhaust gas and a cylinder of which the combustion order is immediately after the cylinder with the lowest degree of uniformity of the flow speed distribution of exhaust gas.

5. An exhaust gas purification system for an internal combustion engine comprising a cylinder group including a plurality of cylinders, the system comprising:
    a three-way catalyst that is arranged in an exhaust passage at the downstream side of a merge portion of exhaust branch pipes which are connected to individual cylinders of the cylinder group; and
    a controller comprising at least one processor configured to control an air fuel ratio of a mixture in a part of the cylinders of the cylinder group to a lean air fuel ratio leaner than a stoichiometric air fuel ratio, and control an air fuel ratio of a mixture in a part of the other cylinders of the cylinder group to a rich air fuel ratio richer than the stoichiometric air fuel ratio, and carry out air fuel ratio dither control in which the air fuel ratio of the mixture in each of one or more lean cylinders, in which the air fuel ratio of the mixture is controlled to the lean air fuel ratio, and one or more rich cylinders, in which the air fuel ratio of the mixture is controlled to the rich air fuel ratio, is controlled in such a manner that an average value of an air fuel ratio of exhaust gas flowing into the three-way catalyst becomes a predetermined target exhaust gas air fuel ratio;
wherein the controller carries out the air fuel ratio dither control, by always setting same one or more cylinders in the cylinder group as the lean cylinders, and by always setting other same one or more cylinders in the cylinder group as the one or more rich cylinders, and
the controller further carries out the air fuel ratio dither control by setting, as the one or more rich cylinders, at least a cylinder for which a maximum flow speed of exhaust gas, which is a maximum flow speed of exhaust gas discharged from the cylinder on a cross section of the three-way catalyst, is the largest in the cylinder group.

6. The exhaust gas purification system for an internal combustion engine as set forth in claim 5, wherein
    the controller further carries out the air fuel ratio dither control by setting, as the one or more lean cylinders, at least a cylinder for which the maximum flow speed of exhaust gas is the smallest in the cylinder group.

7. The exhaust gas purification system for an internal combustion engine as set forth in claim 5, wherein
    when the air fuel ratio dither control is carried out by setting, as the one or more rich cylinders, two or more of the plurality of cylinders in the cylinder group, the controller carries out the air fuel ratio dither control, by setting, as the one or more rich cylinders, cylinders in the cylinder group in descending order of the maximum flow speeds of exhaust gases from the largest maximum flow speed of exhaust gas.

8. The exhaust gas purification system for an internal combustion engine as set forth in claim 5, wherein
    when the air fuel ratio dither control is carried out by setting, as the one or more rich cylinders, two cylinders of which the order of combustion is continuous among the plurality of cylinders in the cylinder group, the controller carries out the air fuel ratio dither control, by setting, as the one or more rich cylinders, a cylinder with the largest maximum flow speed of exhaust gas in the cylinder group, and another cylinder for which the maximum flow speed of exhaust gas is the larger of a cylinder of which the combustion order is immediately before the cylinder with the largest maximum flow speed of exhaust gas and a cylinder of which the combustion order is immediately after the cylinder with the largest maximum flow speed of exhaust gas.

* * * * *